(12) United States Patent
Rorro et al.

(10) Patent No.: US 11,640,580 B2
(45) Date of Patent: May 2, 2023

(54) INVENTORY READY DATE TRAILER PRIORITIZATION SYSTEM

(71) Applicant: Target Brands, Inc., Minneapolis, MN (US)

(72) Inventors: Michael Rorro, Minneapolis, MN (US); Daniel J. Johnson, Minneapolis, MN (US); John Evers, Minneapolis, MN (US); Alexander Bliss, Minneapolis, MN (US); Jesse Sprinkel, Minneapolis, MN (US)

(73) Assignee: TARGET BRANDS, INC., Minneapolis, MN (US)

( * ) Notice: Subject to any disclaimer, the term of this patent is extended or adjusted under 35 U.S.C. 154(b) by 0 days.

(21) Appl. No.: 17/198,842

(22) Filed: Mar. 11, 2021

(65) Prior Publication Data

US 2022/0292455 A1    Sep. 15, 2022

(51) Int. Cl.
*G06Q 10/0875* (2023.01)
*G06Q 10/0833* (2023.01)
(Continued)

(52) U.S. Cl.
CPC ..... *G06Q 10/0875* (2013.01); *G06Q 10/0832* (2013.01); *G06Q 10/0833* (2013.01); *G06Q 10/0838* (2013.01)

(58) Field of Classification Search
CPC .......... G06Q 10/0875; G06Q 10/0832; G06Q 10/0833; G06Q 10/0838
See application file for complete search history.

(56) References Cited

U.S. PATENT DOCUMENTS 7,136,832 B2     11/2006   Li et al.
7,603,299 B1 *   10/2009   Dewey, Jr. ........... G06Q 10/087
                                              700/32
(Continued)

FOREIGN PATENT DOCUMENTS

CN         109636080 A    *   4/2019
WO      WO-2006065744 A2 *   6/2006  ............. G06Q 10/00

OTHER PUBLICATIONS

Ewell, Barry. "A DC Walkthrough in the Receiving Workflow Provides a Closer Look at Unloading and Checking Steps". Retrieved from <https://sps.honeywell.com/us/en/support/blog/productivity/a-dc-walkthrough-in-the-receiving-workflow-provides-a-closer-look-at-unloading-and-checking-steps>. May 2020. (Year: 2020).*

(Continued)

*Primary Examiner* — Nathan A Mitchell
(74) *Attorney, Agent, or Firm* — Barnes & Thornburg LLP

(57) ABSTRACT

Systems and methods for prioritizing trailers can include receiving a list of trailers at a distribution center, determining, for each trailer, an aggregate inventory readiness date, and ranking, into a high priority list, one or more trailers of the trailers that contain high priority items. The method can also include ranking, into an inventory readiness date list, one or more trailers of the trailers that were not added to the high priority list based on the aggregate inventory readiness date of each trailer, selecting, from the inventory readiness date list, trailers having the same aggregate inventory readiness date, ranking those trailers into a store need list based on one or more of the trailers containing needed items. The method can also include generating a trailer unload prioritization list based on combining the high priority list, the inventory readiness date list, and the store need list, and outputting the list.

20 Claims, 16 Drawing Sheets

(51) Int. Cl.
*G06Q 10/083* (2023.01)
*G06Q 10/0832* (2023.01)

(56) References Cited

U.S. PATENT DOCUMENTS

| | | | |
|---|---|---|---|
| 7,900,153 | B2 | 3/2011 | Damodaran et al. |
| 7,969,306 | B2 | 6/2011 | Ebert et al. |
| 8,050,956 | B2 | 11/2011 | Abo-Hasna et al. |
| 8,087,867 | B2 | 1/2012 | Tian |
| 8,949,147 | B1 | 2/2015 | Chowdhury |
| 9,171,277 | B2 | 10/2015 | Rutt et al. |
| 9,367,827 | B1 * | 6/2016 | Lively ............... G06Q 10/08355 |
| 10,089,595 | B2 | 10/2018 | Hoffmann |
| 10,296,857 | B2 | 5/2019 | Burrows et al. |
| 10,515,332 | B2 | 12/2019 | Bielefeldt et al. |
| 2003/0167214 | A1 * | 9/2003 | Kang ................ G06Q 10/0875 705/29 |
| 2005/0171856 | A1 | 8/2005 | Takahashi et al. |
| 2005/0265083 | A1 | 12/2005 | Perry |
| 2006/0282284 | A1 * | 12/2006 | Daniel ................ G06Q 30/06 705/330 |
| 2009/0164345 | A1 * | 6/2009 | Pierce ................ G05B 15/02 705/29 |
| 2011/0050397 | A1 | 3/2011 | Cova |
| 2011/0131201 | A1 | 6/2011 | Lin |
| 2011/0230994 | A1 | 9/2011 | Spearman |
| 2011/0251716 | A1 | 10/2011 | Buzzoni et al. |
| 2012/0283868 | A1 * | 11/2012 | Rutt ................ G06Q 10/083 700/214 |
| 2012/0303498 | A1 | 11/2012 | Cova et al. |
| 2014/0365258 | A1 | 12/2014 | Vestal et al. |
| 2015/0046363 | A1 | 2/2015 | McNamara et al. |
| 2015/0269517 | A1 | 9/2015 | Berichon et al. |
| 2015/0269617 | A1 | 9/2015 | Mikurak |
| 2015/0352721 | A1 | 12/2015 | Wicks et al. |
| 2016/0110683 | A1 | 4/2016 | Gupta et al. |
| 2016/0171441 | A1 | 6/2016 | Lively et al. |
| 2018/0082183 | A1 | 3/2018 | Hertz et al. |
| 2018/0094953 | A1 | 4/2018 | Colson et al. |
| 2018/0293527 | A1 * | 10/2018 | Amirjalayer ......... G06Q 10/087 |
| 2018/0300669 | A1 | 10/2018 | Gabrielson |
| 2019/0139174 | A1 * | 5/2019 | Ward ................ G06K 19/0723 |
| 2019/0164128 | A1 * | 5/2019 | Millhouse ............... H04L 67/12 |
| 2019/0392380 | A1 | 12/2019 | O'Brien ................ G06Q 10/087 |
| 2020/0273133 | A1 * | 8/2020 | Morris ............ G06Q 10/06315 |
| 2021/0084450 | A1 * | 3/2021 | Catalena ................ H04W 48/16 |

OTHER PUBLICATIONS

Jackson, David. "Managing and Scheduling Inbound Material Receiving at a Distribution Center". Masters thesis, MIT. 2005. (Year: 2005).*

Bazgosha et al. "Scheduling of loading and unloading operations in a multi stations transshipment terminal with release date and inventory constraints". Computers & Industrial Engineering, vol. 106, pp. 20-31. Apr. 2017. (Year: 2017).*

* cited by examiner

Inbound Prioritization Table 1500

| DC | Rank | Apt. No. | In-Yard? | In-Yard Timestamp | IRD | Total Cartons | Item Count | Match % | Category | Store Need Score |
|---|---|---|---|---|---|---|---|---|---|---|
| 3802 | 1 | 114197 | Yes | 01/22/2021; 08:01:47 | 01/24/2021 | 22 | 2 | 100.00 | CV Crisis – Priority Trailers | 0 |
| 3802 | 2 | 113042 | Yes | 01/16/2021; 09:23:09 | 01/18/2021 | 21 | 1 | 95.2 | Trailer Aging 6 Days | 14257 |
| 3802 | 3 | 113905 | Yes | 01/15/2021; 18:10:32 | 01/18/2021 | 17 | 1 | 100.00 | Trailer Aging 6 Days | 6 |
| 3802 | 4 | 114613 | Yes | 01/21/2021; 09:48:35 | 01/23/2021 | 120 | 1 | 50.0 | CS Sensitive – Priority Trailers | 9352 |

INVENTORY READY DATE TRAILER PRIORITIZATION SYSTEM

TECHNICAL FIELD

This document generally relates to technology for prioritizing trailers in supply chain management.

BACKGROUND

Supply chains are, in general, complex networks through which goods are supplied from producers to retailers and, ultimately, consumers. For example, supply chains can involve many different producers that are generating products for distribution, each of which may emanate from multiple different production and/or distribution facilities. These products can be transported using any of a variety of carriers, such as trailers, trucks, railcars, and/or boats, and in many instances may involve using multiple different carriers as items are transported through the supply chain (e.g., boat for transport over ocean, rail to transport from port to distribution center, and truck from distribution center to retail store). Additionally, items may be processed through one or more distribution center before they ultimately are delivered to retail stores and/or directly to consumers.

A product's inventory ready date (IRD) can be used to track the product's progress through the supply chain relative to that date. IRD maps out when a product can be expected to arrive at a distribution center and includes target dates for intermediate points along the supply chain to ensure that the IRD is met. Failure to meet an intermediate date can trigger prioritization and other expedited handling at intermediate points along the supply chain to ensure that the IRD is met, which can result in inefficiencies and delays throughout the supply chain.

SUMMARY

The disclosed technology is generally directed to systems and methods for prioritizing trailers based on their inventory ready date (IRD). The IRD can be the date on which items will arrive at and be available for distribution at a distribution center (e.g., inventory unloaded from truck and available within distribution center for redistribution to, for instance, retail store or direct customer shipment). A trailer can have an aggregate IRD that is an average of the IRD of each product the trailer contains. The IRD can be a singular target date that different actors and users of the supply chain can unify around, such as buyers, suppliers, distributors, carriers, and retailers. Previously, these different actors may have each had their own target dates and deadlines, which may have looked at only their smaller portion of the supply chain without broader supply chain considerations. IRD can be a unified target date against which all actors within the supply chain can organize around, with the ultimate goal being the holistic improvement and satisfaction of the supply chain's objectives—to supply requested items to distributors and retailers to meet demand for the items and avoid out of stock scenarios.

The disclosed technology is generally directed to the use of IRD to prioritize trailers for unloading at a distribution center. The disclosed technology provides for prioritizing trailers that are closer to (or past) their IRD instead of simply unloading trailers as they arrive at a distribution center. The disclosed technology also provides for prioritizing trailers based on whether they contain high priority items and/or items that are out of stock or in low inventory (e.g., store need metric) in one or more stores that are serviced by the distribution center. Prioritizing based on IRD, priority, and store need metrics can maximize the number of trailers and goods that can satisfy their IRD, improve efficiency of an overall supply chain, and minimize out of stock scenarios in the serviced stores. A trailer prioritization system as described throughout this disclosure can determine an aggregate IRD for a trailer, which can be based on the IRD of the goods contained in the trailer, as well as factors relating to a current state of inventory (e.g., whether items are out of stock) at the distribution center and in stores that are serviced by the distribution center. All the trailers at the distribution center can then be prioritized based on their aggregate IRD to provide for efficient unloading at the distribution center.

The disclosed technology can further provide for better and more accurate tracking and assessment of the supply chain, including determining inventory readiness metrics, which indicate whether loads and orders are on schedule for delivery to distribution centers by a target date. The disclosed technology can use the IRD to track the status of the supply chain and to manage the allocation of resources, such as prioritizing shipments that have fallen behind their target IRD. The disclosed technology can also provide visualization tools that can be used to visualize the supply chain and its contents, and to manage the supply chain.

Particular embodiments described herein include a method for prioritizing trailers, the method including receiving a list of a plurality of trailers at a distribution center, determining, for each trailer of the plurality of trailers, an aggregate inventory readiness date, and ranking, into a high priority list, one or more trailers of the plurality of trailers that contain high priority items. The method can also include ranking, into an inventory readiness date list, one or more trailers of the plurality of trailers that were not added to the high priority list based on the aggregate inventory readiness date of each trailer, selecting, from the inventory readiness date list, one or more trailers having the same aggregate inventory readiness date, and ranking, into a store need list, the trailers having the same aggregate inventory readiness date based on one or more of the trailers containing needed items. The method can also include generating a trailer unload prioritization list based on combining the high priority list, the inventory readiness date list, and the store need list, and transmitting, to an output computing device, the trailer unload prioritization list.

Particular embodiments described herein can also include a system for prioritizing trailers, the system including one or more processors and computer-readable memory storing instructions that, when executed by the processors, cause the processors to perform operations that include any one or more of the method and features described herein.

In some implementations, the system and method can optionally include one or more of the following features. For example, determining, for each trailer of the plurality of trailers, an aggregate inventory readiness date can include selecting a trailer from the plurality of trailers, receiving an inventory list for the selected trailer, retrieving an inventory readiness date for each item in the inventory list of the selected trailer, and determining an aggregate inventory readiness date for the selected trailer based on calculating at least one of an average, a mean, a median, a minimum, or a maximum inventory readiness date based on the inventory readiness date for each item in the inventory list. As another example, ranking, into a high priority list, one or more trailers of the plurality of trailers that contain high priority items can include receiving a list of high priority categories, comparing an inventory list of each of the plurality of trailers to the list of high priority categories, prioritizing, into the high priority list and based on comparing the inventory list of each of the trailers to the list of high priority categories, one or more trailers having items that correspond to the list of high priority categories, determining whether one or more remaining trailers that were not prioritized into the high priority list contain a quantity of items that exceeds a predetermined threshold quantity, and adding, to the high priority list, the one or more remaining trailers that have a quantity of items that exceeds the predetermined threshold quantity. As yet another example, one or more trailers in the inventory readiness date list can be ranked from earliest inventory readiness date to latest inventory readiness date.

As another example, ranking the one or more trailers having the same aggregate inventory readiness date into the store need list can include receiving a list of needed items for stores serviced by the distribution center, comparing an inventory list of each of the trailers having the same aggregate inventory readiness date to the list of needed items, identifying one or more trailers having needed items, based on comparing the inventory list of each of the trailers to the list of needed items, determining, for each of the one or more trailers having needed items, a quantity of needed items, assigning, for each of the one or more trailers having needed items, a store need score based on the quantity of needed items, and ranking, into the store need list, the one or more trailers having the same aggregate inventory readiness date based on the store need score of each of the one or more trailers having needed items. The store need score can be a numeric value indicating a proportion of a trailer that contains needed items. A trailer having a higher store need score can be ranked above a trailer having a lower store need score. The method can further include receiving store need information from each of the stores serviced by the distribution center, wherein the store need information includes a list of needed items, a quantity needed of each needed item, and an inventory position of each needed item, determining, based on the received store need information, an aggregate quantity of each needed item across the stores serviced by the distribution center, and ranking, based on the inventory position of each needed item, the needed items across the stores serviced by the distribution center. The method can also include receiving an updated list of needed items in real-time. The method can also include receiving one or more lists of needed items at predetermined times.

As another example, ranking trailers within the high priority list can further include ranking the trailers having high priority items based on at least one of an urgency of a high priority item, a quantity of the high priority item in each of the trailers, or the aggregate inventory date of each of the trailers. The output computing device can be at least one of a mobile device, a smartphone, a tablet, or a distribution center computing system. The method can also include updating at least one of the high priority list, the inventory readiness date list, or the store need list based on receiving real-time information about at least one of one or more trailers, high priority items, or needed items.

The systems, devices, program products, and processes described throughout this document can, in some instances, provide one or more of the following advantages. For example, out of stock scenarios in stores serviced by the distribution center can be minimized and/or avoided. Using metrics such as IRD, item priority, and store need information in the distribution center and/or the stores serviced by the distribution center, the disclosed technology can provide for unloading of trailers that takes into consideration not only the trailer IRD but also how the supply chain will be effected based on an order in which the trailers are unloaded. Trailers can be prioritized and efficiently unloaded to satisfy IRDs and avoid out of stock scenarios in stores serviced by the distribution center, which further enhances the entire supply chain.

In another example, given the magnitude of supply chain data, it can be challenging to determine the current status and state of the supply chain (e.g., on track, behind schedule, ahead of schedule). The disclosed technology provides improved solutions, over convention supply chain management systems and platforms, in that it is able to simplify this problem and provide a comprehensive solution that can permit for tracking and assessing the supply chain at a variety of different levels of granularity (e.g., load level, distribution center level, retail store department level). For instance, through the use of load tracking and order tracking, which can build on load tracking results, can be used to generate inventory readiness metrics (e.g., ahead of schedule, behind schedule, on track relative to IRD) across multiple different dimensions, including across loads (e.g., trucks, boats, trains) and across orders (e.g., purchase order placed with vendors). The inventory readiness metrics can be used to prioritize trailers in a way that accounts for the trailers' IRDs as well as high priority and store need information.

In another example, the disclosed technology can improve overall supply chain management. For instance, complex orders made of hundreds, thousands, or millions of items can be tracked to create metrics that are far simpler than the raw tracking data, while still providing a viewer with enough information to understand the status of the order. This technology can be used for orders that will be supplied from many sources, to be sent to many destinations, by many different types of cargo haulers. Additional advantages can be recognized from the disclosure herein.

DESCRIPTION OF DRAWINGS

FIG. 15 is another depiction of the inbound prioritization trailers of FIG. 14.

Like reference symbols in the various drawings indicate like elements

DETAILED DESCRIPTION

As described above, this document describes systems and methods for prioritizing trailers based on their inventory ready date (IRD) as well as information about high priority items and items needed in stores that are serviced by a distribution center. As described, trailer IRDs can be assessed to determine which trailer is close to or passed its IRD. Based on such a determination, the trailer can be unloaded before a trailer that has a later IRD. Moreover, a trailer that contains high priority items can be prioritized before trailers having earlier IRDs. Trailers that have the same IRD can be further prioritized based on whether any one of those trailers contain items that are needed in one or more of the stores that are serviced by the distribution center. The systems, methods, and processes described herein can improve efficiency in unloading trailers based on IRD, high priority information, and store need information, as well as improve overall supply chain management.

Figure 1:
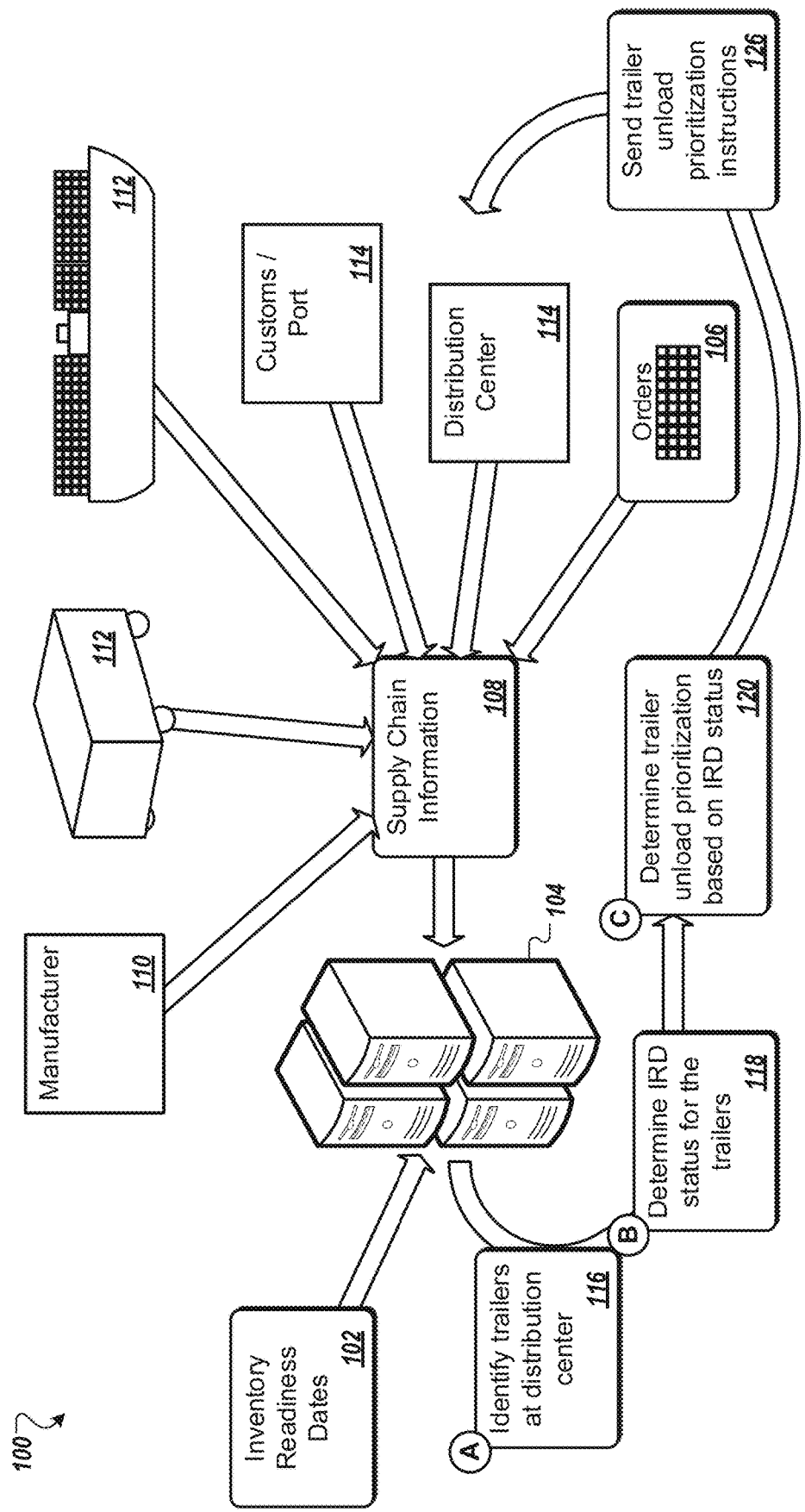
FIG. 1 is a diagram of a system for determining trailer prioritization.

Referring to the figures, FIG. 1 shows a diagram of a system 100 for determining trailer prioritization. In general, an inventory readiness date (IRD) 102 represents the date at which items ordered in a single order should be ready for use in a warehouse, distribution center, store, or other end location. This IRD 102 may be different, and later, than the day the items arrive at the distribution center. For example, if it takes 24 hours to unload a trailer (e.g., truck), unpack boxes, open containers, etc., before the item is sitting on the shelf ready to be accessed, the IRD 102 may be one day later than the day that the item should arrive in the trailer at the distribution center.

A trailer prioritization computer system 104 can receive information for one or more orders 106. The orders 106 may each specify a collection of information. For example, the orders 106 may specify a list of items, a destination for each item (e.g., various stores, distribution centers), a source for each item (e.g., a factory, manufacturer, or other source of the item), price information, and/or handling information (e.g., weight, size, compatible containers). Each order 106 may be matched to an inventory readiness date 102. In this way, a large, multi-facility enterprise may be able to create complex, multi-item, multi-facility orders in a unified process.

To monitor the status of the order (e.g., to help a user understand if the manufacturers and suppliers are shipping the ordered items), the trailer prioritization computer system 104 can receive supply chain information 108 that contains information about the supply chain that is used to complete the orders 106. For example, the supply chain information 108 can include reporting data from manufacturers 110, including estimated and actual dates of manufacture, dates of shipment, etc. The supply chain information 108 can include reporting data for containers 112, including trailers, railcars, container trucks, ships, etc. The reporting data for containers 112 can include scheduling information, location tracking information, route information, etc. The supply chain information 108 can include reporting data from intermediate locations 114, including customs, ports, and distribution centers. In general, these intermediate locations can include locations where items, or containers holding the items, are temporarily held when in transit from their source (e.g., a manufacturer) to their destination (e.g., a fulfilment center). In some cases, the computer system 104 can filter, decorate, or otherwise alter the supply chain information 108 on receipt. For example, a large enterprise may generate a very large amount of data. Of this data, only a portion may be needed, and the unneeded portions may be filtered out. Similarly, the computer system 104 may decorate incoming supply chain information 108. For example, geolocation information may be decorated with the state or country in which the location resides.

The received information may be structured in the form of data events that each record a physical event that occurs in the supply chain. For example, a load arriving at a destination may create an event, a GPS location heartbeat message may be an event, etc. These events may be listened to by various components of the computer system 104 and, upon receipt of a new event, may launch one or more of the processes described in this document. In some cases, events may cause the update to data related to an order or load (e.g., updating location, IRD risk, or other data).

The trailer prioritization computer system 104 can use the received information 102 and 108 to prioritize unloading trailers (e.g., container 112) at the distribution center. For example, the computer system 104 can identify trailers at the distribution center in 116. The computer system 104 can then determine IRD status for each of the identified trailers in 118. Determining the IRD status can include identifying whether a trailer has high priority items or items that satisfy store need scenarios in one or more stores that are serviced by the distribution center. The computer system 104 can then determine trailer unload prioritization based on the IRD status in 120. Trailer unload prioritization instructions can be sent to a distribution center system at the distribution center in 126. The trailers at the distribution center can then be unloaded according to the prioritization instructions.

Figure 2:
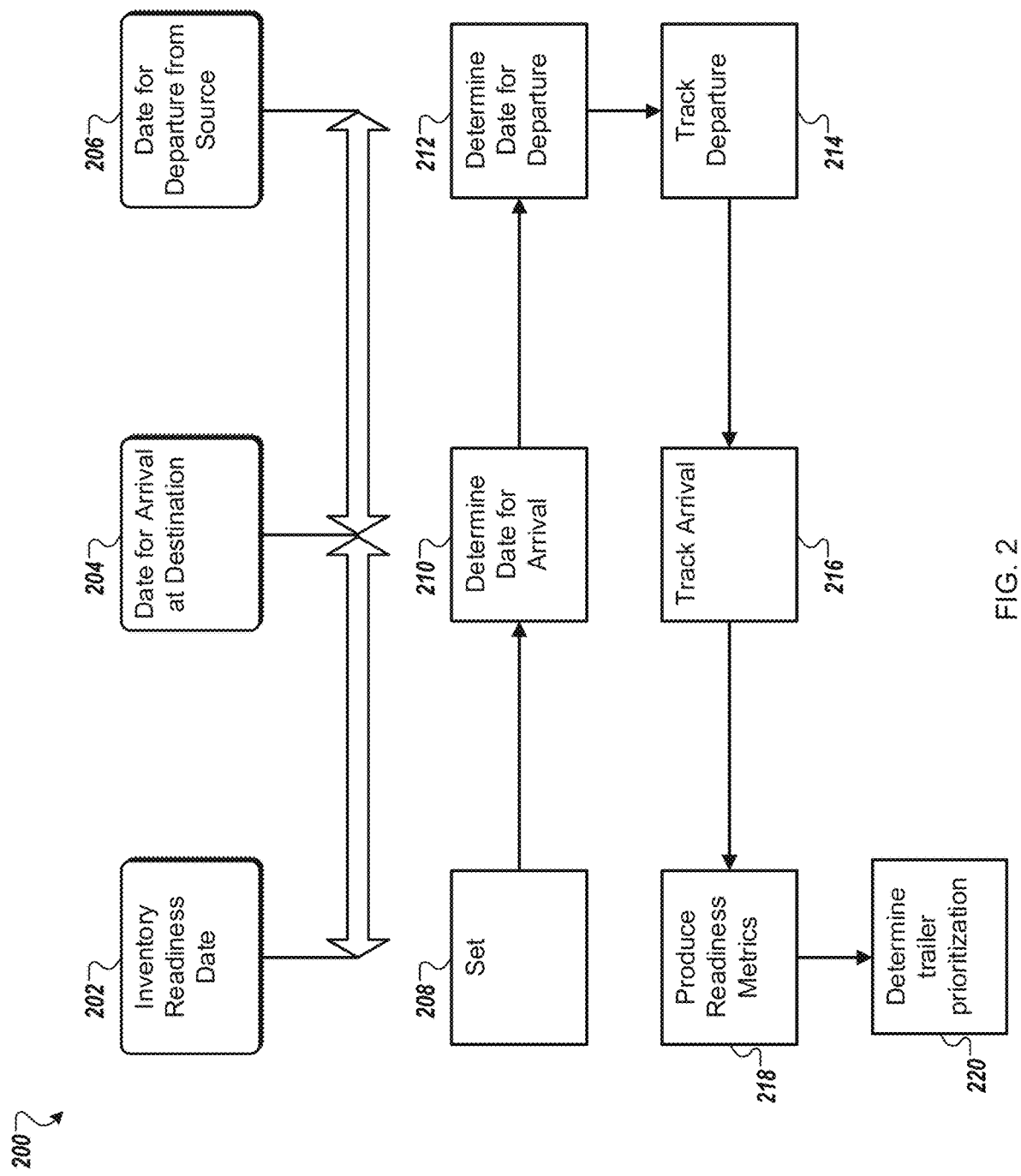
FIG. 2 is a flowchart of a process for generating inventory readiness metrics and trailer prioritization.

FIG. 2 shows a flowchart of a process 200 for generating inventory readiness metrics and trailer prioritization. In the process 200, an IRD 202 is set 208, and then from there intermediate dates are determined based on various factors of the supply chain. In general, these intermediate dates act as benchmarks to aid in the evaluation of IRDs 202—if the intermediate dates are being met, the order is likely on time, and if the intermediate dates are not being met, the order is likely to be late.

One intermediate date can be a date for arrival at destination 204, which may include a distribution center, a store, etc. As previously explained, the item may not be ready for use when it initially arrives at its destination. It may need to be unloaded, unpacked, inspected, assembled, and placed on a shelf, etc., before it is available for use. This process may take a significant enough amount of time that i) the process may impact the IRD if it goes slower than normal and ii) the process may be abstracted away without impacting the accuracy of the IRD analysis. For example, an item traveling down a two foot ramp from the back of a shelf to the front may take seconds and be fast enough to not need accounted for, but the unpacking discussed here may involve hours or days of work from arrival at the destination.

One intermediate date can be a date of departure from the item's source 206. This source may in some cases be the location where the item is manufactured, mined, generated, or assembled. In some cases, the source may be the first point at which the supply chain is automatically monitored. For example, a supplier of raw materials may not provide detailed, electronic tracking information until the raw materials arrive at the customs-controlled port where the material is being exported. In such a case, the customs-controlled port may be the source of the item, even if it is hundreds of miles from where the raw material is grown, extracted, manufactured, etc.

Two intermediate dates are shown here, but other intermediate dates can be used, including more or fewer dates. For example, if the items must from the source by rail car, then by ship, then by truck before arrival at the destination, additional intermediate dates may be used to represent the transition from rail to ship, and from ship to truck, as well as additional intermediate dates within each of those modes of transit (e.g., intermediate date for carrier reaching one or more intermediate locations and/or progress points). Additional and/or alternative intermediate dates can include stops in which some, but not all, of a load are unloaded or loaded. For example, a truck may have a load with items destined for two different retail stores, and each arrival and departure from the two retail stores may also have an intermediate date.

Still referring to the process 200, an IRD is set 208. For example, a computer system can receive, from outside of the computer system, input that specifies and IRD. This input may take the form of user input entering the data through a graphical user interface (GUI). This input may take the form of a data message transmitted over a data network. The receiving computer system can, using the input, store the IRD to computer memory to specify a first calendar date on which an order of items should be ready at each items' respective destination location. In some cases, the IRD is received as part of input that specifies the order for the computer system.

An arrival date is determined for each item of the order 210. For example, the computer system may access data for each item of the order and identify a destination for that item. For example, the order may specify one million identical items, with ten thousand items being ordered for each of one hundred distribution centers located across a country. Each distribution may have recorded the number of days that the center normally takes to unload and make ready such items—one day, two days, or three days. As such, the computer system may determine arrival dates 204 for each distribution center that are one day, two days, or three days before the IRD 202. As such, for each item of the order, an arrival date is set before the readiness date, the arrival date specifying a second calendar date on which the item should arrive at the item's respective destination location.

A departure date is determined for each item of the order 212. For example, the computer system may access data for each item of the order and identify a source for that item. For example, the items may be shipped from one of three factories spread across the country. Given the source of the item along with the destination now, the computer system can determine a length of time needed to transport the item from the source to the destination. Working backwards from the arrival date 204, the computer system can determine a departure date before the arrival date, the departure date specifying a third calendar date on which the item should depart the item's respective source location. For example, if a particular item has an IRD 202 of Friday, an arrival date 204 of Thursday, and requires two days to transit from the source to the destination, a departure date of Tuesday may be determined.

In some cases, determining, for each item of the order, an arrival date and determining, for each item of the order, a departure date, comprises querying a user for the second calendar date and the third calendar date. For example, the computer system may generate one or more GUIs to provide a user with an order specification screen. The user may input, into the screen, details about the order. This can include the IRD 202, the arrival date 204, and the departure date 206. In some implementations, this information may be generated based on secondary considerations input by the user. For example, the user may specify an IRD 202 and request arrival dates and departure dates calculated to reduce transit costs, time in transit, storage overhead, etc. In another example, the user may enter the departure date, as that may be inflexibly set by the manufacturer, and from there the GUI may guide the user to select other aspects of the order (e.g., shipping method or IRD), and the system may proposed values given those inputs (e.g., providing an IRD given the shipping method, providing a recommended shipping method given the IRD).

Events such as departure events are tracked in 214 and arrival events are tracked 216. For example, as the items move through the supply chain, the computer system may receive tracking updates of such movement and identify transit events (e.g., departure events, arrival events). Based on these events, the computer system can keep up-to-date of location data for each item. In addition, estimates of future arrivals and/or departures can be updated based on the new information, and these projections can be compared against IRD to determine the risk level for various items (e.g., high risk of item missing IRD based on projected arrival date). For example, if a load arrives to one destination a day early, projected future arrivals and departures may be adjusted by one day to reflect this updated understanding of load status, which can additionally update the IRD-based status of the items contained with the load.

In some cases, this process can include receiving tracking data from a plurality of shipping containers, each shipping container containing at least one of the items. These shipping containers can include vehicles such as trucks, rail cars, and ships that may have global positioning data (GPS) or route data reported. These shipping containers can include boxes, bins, bags, or pallets that include bar codes, wireless data tags, or other technology used to generate tracking information. As the various types of shipping have different real-world capabilities and options (e.g., trucks can unload at a store, but boats are unlikely to) data for each type of container can be configured to reflect those real world capabilities and options. As such, data for different containers may be handled differently by the systems.

Readiness metrics are produced 218. For example, for each item of the order discussed in this example, the computer system can generate an inventory readiness metric based on the item's travel based on tracking data for the item as the item travels from the item's respective source location to the respective destination location. For example, the computer system can compare actual departure events and actual arrival events to the planned arrival date 204 and the planned departure date 206.

In one example, items that actually depart or arrive before their planned dates can be tagged as "ahead of schedule", items that actually depart or arrive on their planned dates can be tagged as "on schedule", and items that actually depart or arrive after their planned dates can be tagged as "behind schedule." In another example, the metric can report a risk of being behind schedule. Items with actual dates ahead of or on the planned dates can be tagged as low risk, items with actual dates behind the planned dates may be marked as "low risk" of missing their IRD, representing the supply chain's flexibility to expedite some items when needed, and items with actual dates more than a day after their planned dates can be marked as "high risk" of missing their IRD.

As tracking events are received, the computer system can continually update the IRD metrics. For example, a particular item may have an actual departure date matching the planned departure date 206. The rail car carrying the item may be delayed in transit, taking four days to travel instead of the planned two, resulting in an actual arrival date that is two days after the planned arrival date 204. In such a case, the item may initially be given an "on time", "green" or otherwise favorable IRD metric. However, when the arrival date lapses (or when another intermediate date lapses), the computer system can update the readiness metric for that item to "late", "red", or otherwise unfavorable.

Trailer prioritization can be determined in 220. For example, the computer system can assess the readiness metrics to determine an order in which to unload trailers (e.g., trucks) at the distribution center. As described throughout this disclosure, the trailers can be unloaded not only based on their aggregate IRD but also based on whether the trailers contain high priority items and/or items that are needed in one or more stores that are serviced by the distribution center.

Figure 3:
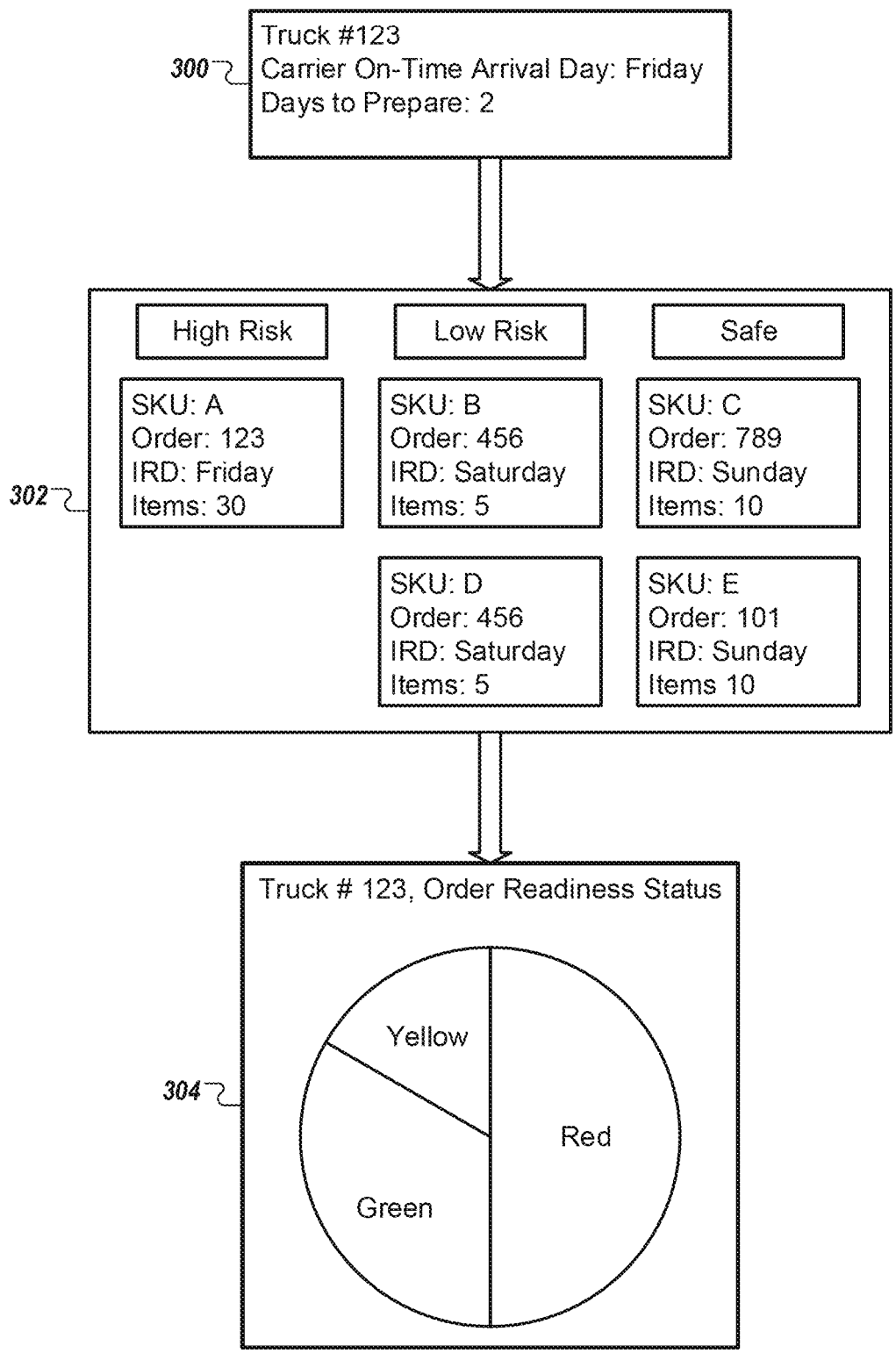
FIG. 3 is a schematic diagram of an example readiness metric.

FIG. 3 shows a schematic diagram of an example readiness metric. In this example, the metric can report a risk of being behind schedule. Items with actual dates ahead of or on the planned dates can be tagged as a "safe" risk level, items with actual dates behind the planned dates may be marked as "low risk" of missing their IRD, representing the supply chain's flexibility to expedite some items when needed, and items with actual dates more than a day after their planned dates can be marked as "high risk" of missing their IRD.

Data 300 can be stored by a computer system to record data related to a container that is used to ship items for an order. For example, items for the order may be recorded as in transit on truck #123. The carrier may have a carrier-scheduled on-time arrival date of Friday. However, as explained above, this date may be different from the IRD or other intermediate dates used to determine IRD metrics. In addition, the data 300 can record the number of days needed to unpack and make ready the items once they reach their destination.

Data 302 can be stored by the computer system to maintain the IRD status of items in the truck #123. In this example, the truck is carrying a total of 60 items across five Stock Keeping Units (SKUs). These 60 items are each assigned to one of four orders, but have been shipped in the truck #123 to enhance overall efficiency of the supply chain. Because they are part of different orders, they may have assigned different IRDs. As such, items from the same truck—a truck that the carrier identifies as "on time"—can nevertheless have different IRD metrics. In this case, items with an IRD of Friday are more than a day behind schedule and marked as "high risk", items a day behind schedule are marked as "at risk", while items on schedule are marked as "safe".

Report 304 reports the risk status of the items in the truck in the form of a multi-factor metric that represents the inventory readiness metric of each item contained by the container. Of note, the pie chart of the report 304 reports risk weighted by item count, not by SKU. So while there are five SKUs in the truck, one SKU contains half of the items and those items are at risk. As such, the pie chart shows half of the area marked "red" for "high risk". Similarly, "low risk" and "safe" have the same number of SKUs but different numbers of items, and thus the "yellow" and "green" areas are of unequal size.

The report 304 may be displayed to a user on a screen, by being printed on paper, etc. With this information, the user can quickly identify the status of the items in the truck and determine if any remedial action should be taken. For example, as this report contains large amounts of red followed by yellow, the user may identify it as a high-priority for redial action. As such, the user may generate an order for the supply chain to expedite the truck #123.

Figure 4:
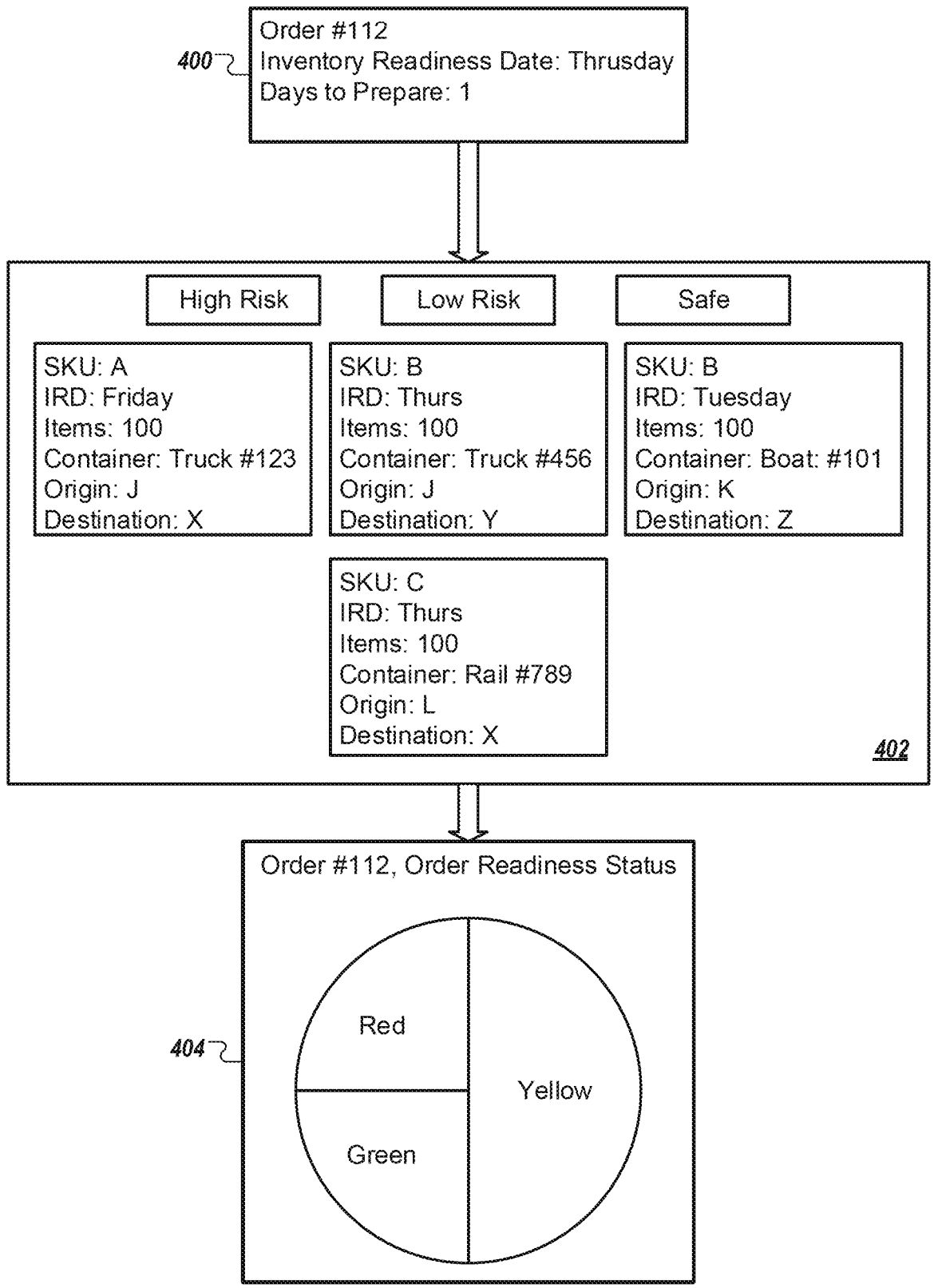
FIG. 4 is a schematic diagrams of an example readiness metric.

FIG. 4 shows a schematic diagram of an example readiness metric. In this example, the metric can report a risk of being behind schedule. Items with actual dates ahead of or on the planned dates can be tagged as a "safe" risk level, items with actual dates behind the planned dates may be marked as "low risk" of missing their IRD, representing the supply chain's flexibility to expedite some items when needed, and items with actual dates more than a day after their planned dates can be marked as "high risk" of missing their IRD.

Data 400 can be stored by a computer system to record data related to items for an order across many containers. For example, items for the order #112 may be recorded with associated metadata. For example, the data 400 can record the IRD for an order and number of days needed to unpack and make ready the items once they reach their destination.

Data 402 can be stored by the computer system to maintain the IRD status of items in the order #112. In this example, 400 items are being transported from various sources, to various destinations, as grouped together by three different SKUs of items (A, B, and C) being transported from three different origin locations (J, K, and L) to three different destinations (X, Y, and Z across four different containers, truck #123, truck #456, rail car #789, and boat #101. As depicted by the combinations of SKU, source location, destination location, and containers that are part of order #112, an order can include multiple different items (e.g., SKUs A, B, and C) that are fulfilled from multiple different source locations (e.g., origins J, K, and L) to multiple different destination locations (e.g., destinations X, Y, and Z) using multiple different carriers (e.g., truck #123, truck #456, rail car #789, and boat #101). In addition, orders with different SKUs can have different IRDs to the same location. For example, SKU A may have an IRD of Thursday and SKU B may have an IRD on a different day (e.g., Friday). Due to this complexity, simply tracking the progress of each of portion of an order is a challenge, let alone the added difficulty in assessing the overall and current IRD-based risk of the order (and its component parts) being unavailable across all of these different moving parts (e.g., different SKUs, source locations, destinations, containers). For example, because each items that is part of the order (represented by SKUs) may be at different points in its transit path, they may have assigned different statuses. As items transition along their transit path, which may include being transferred between different containers, the status of the items and their projection relative to IRD can be updated (e.g., events identifying progress of items can be received and used to update IRD-based status for items). As such, items set to arrive at least a day before the IRD are set to "safe", items set to arrive on the IRD date are marked "low risk", and items arriving after the IRD date are marked as "high risk". Other rating schemes may be used.

Report 404 reports the risk status of items in the order in the form of a first multi-factor metric that represents the inventory readiness metric of each item of the order. Of note, the pie chart of the report 404 reports risk weighted by item count, not by container. However, in this case, each container contains the same number of items, so the size of each section of the chart happens to correlate to the number of containers in each risk category.

The report 404 may be displayed to a user on a screen, by being printed on paper, etc. With this information, the user can quickly identify the status of the items in the order and determine if any remedial action should be taken. For example, as this report contains large amounts of red followed by yellow, the user may identify it as a high-priority for redial action. As such, the user may generate an order for the supply chain to temporarily halt activities that use many of the items in the order #112.

Figure 5:
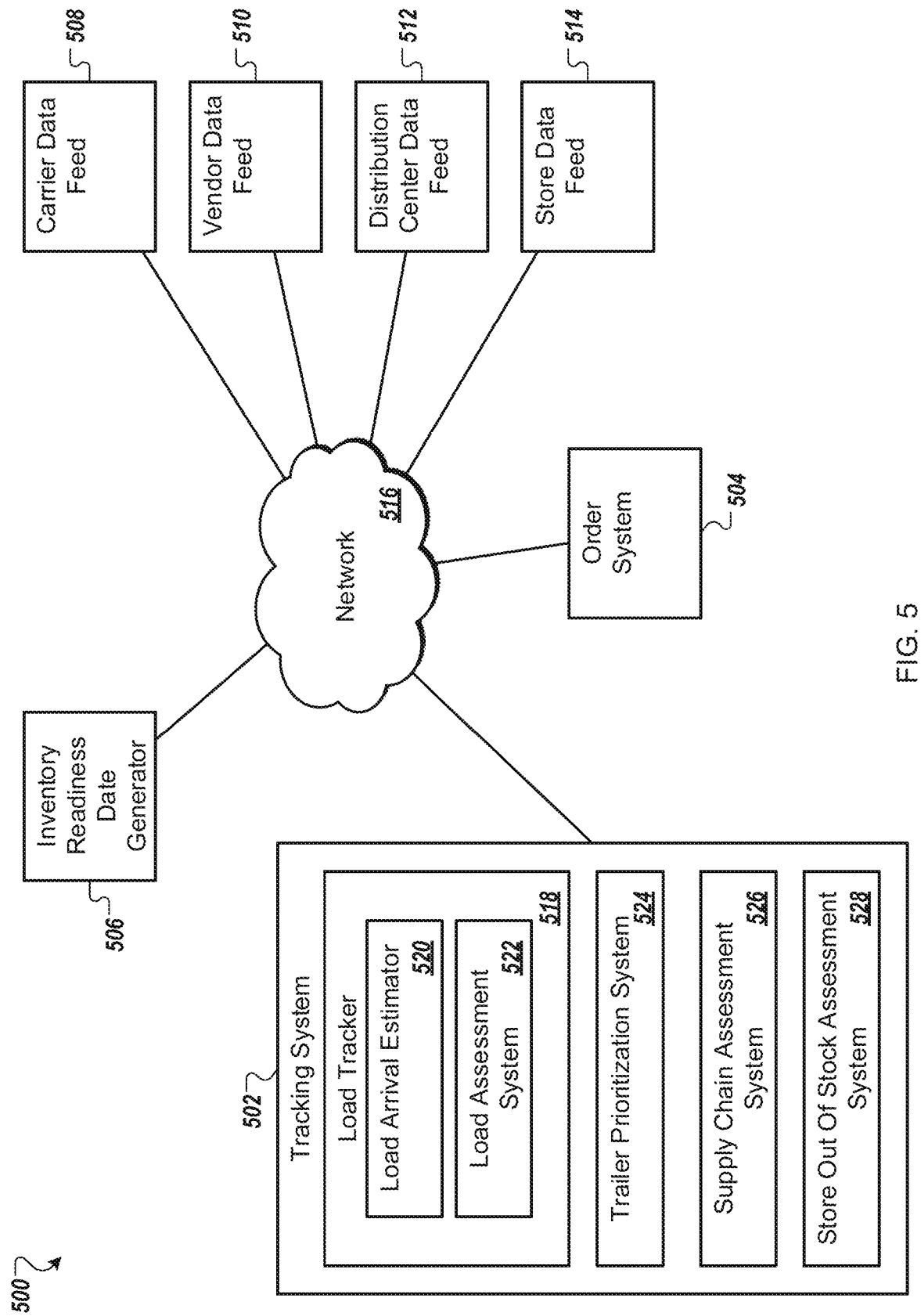
FIG. 5 is a diagram of a computing system for determining trailer prioritization.

FIG. 5 is a diagram of a system 500 that includes computer devices that operate to determine trailer prioritization. In the system 500, a tracking system 502 (e.g., computing system) can receive data from other elements of the system 500 and can generate new data to report on the status of the supply chain and prioritize trailers. For example, an order system 504 can report, to the tracking system 502, details about orders that are to be fulfilled using the supply chain. This order information can include a listing of items in the order, sources for the items, destinations for the items, etc. An inventory readiness date generator 506 can generate, from the order information and other data in the system 500, inventory readiness dates for the orders.

Various data feeds can supply data to the tracking system 502 on an ongoing basis. A carrier data feed 508 can supply the tracking system 502 with carrier tracking data. This data can include shipping events (e.g., departure from a particular location by a particular container), status data (e.g., geolocation data, speed, direction, fuel status), and carrier-based-status values (e.g., on time, ahead of schedule, or late, according to carrier quality of service agreements).

A vendor data feed 510 can supply the tracking system 502 with vendor tracking data. This data can include vendor events (e.g., sale of items that are ordered), status data (e.g., where items are in the manufacturing process), and vendor-based-status values (e.g., if the manufacturing process is on time, ahead of schedule, or late, according to vendor contracts). A distribution center data feed 512 can supply the tracking system 502 with distribution center tracking data. This data can include information about the status of items in the distribution center (e.g., including both items that were ordered as part of the orders discussed above and items not ordered as discussed), and the capabilities of the distribution center (e.g., time to unload items, ability to sort and assemble parts). A store data feed 514 can supply the tracking system 502 with store tracking data. This data can include information about the status of items arriving and for sale at stores, and the capabilities of the stores (e.g., time to unload items, ability to sort and assemble parts).

A network 516 can provide data communication between elements of the system 500. For example, the data network can create, maintain, and tear down data connections that allow messages to be sent by one element and received by another element. The network 516 can include the Internet, private networks, public networks, etc.

The tracking system 502 can include a load tracker 518 that is able to execute operations to track loads of items. For example, the load tracker 518 may maintain, in computer memory, a list of loads in containers (e.g., trailers). This list of containers can also include, for each container, a list of items in the load, the order number of the items, the locations of the containers, IRDs for each of the items in the load, etc. A load arrival estimator 520 can execute operations to estimate arrival times of loads. For example, the load estimator 520 may maintain, in computer memory, a list of planned arrival dates (e.g., arrival dates 204) for each load being tracked. The load estimator 520 may also store other data to determine if the loads being tracked are likely to meet their planned arrival dates. For example, this data may include intermediate benchmarks, geolocation data, travel velocity, traffic data, weather data, etc. This other data may be submitted to a classifier to identify one or more likely arrival dates.

A load assessment system 522 may submit this other data (e.g., the intermediate benchmarks, geolocation data, travel velocity, traffic data, weather data, etc.) to one or more classifier functions that return one or more estimated arrival dates, given the input. This estimated date may take the form of a single date estimated to be the most likely, a plurality of dates each having an associated confidence value, etc. Optionally, the load assessment system 522 can be configured to determine aggregate IRDs for each of the trailers at the distribution center. The aggregate IRD of a trailer can be determined by, for example, averaging the IRDs for each of the items contained in the trailer (e.g., refer to FIG. 9). One or more other components of the system 500 can determine aggregate IRDs, such as the inventory readiness date generator 506 and/or a trailer prioritization system 524.

The tracking system 502 also includes the trailer prioritization system 524 that is able to execute operations to generate an order by which trailers (e.g., containers) are unloaded in the distribution center. For example, as described herein, the system 524 can determine an order to unload trailers based on their aggregate IRDs and/or whether the trailers contain high priority items or items that are needed in stores serviced by the distribution center.

A supply chain assessment system 526 of the tracking system 502 can generate assessments of the supply chain. For example, the system 526 can generate the report 304 and/or the report 404, as previously described.

A store out of stock assessment system 528 of the tracking system 502 can determine whether one or more stores that are serviced by the distribution center have items that are out of stock or in low inventory. The system 528 can receive inventory lists in real-time and/or at predetermined times throughout the day from each of the stores serviced by the distribution center. Using the inventory lists, the system 528 can determine which items across all the stores serviced by the distribution center are (i) currently out of stock, (ii) low stock and going to be out of stock within a period of time, or (iii) not at risk of being low stock or out of stock within the period of time. The system 528 can then identify which trailers that have the same IRD contain items that are out of stock and prioritize unloading those trailers. The store out of stock assessment system 528 can then communicate the list of prioritized trailers having the same IRD with the trailer prioritization system 524. The system 524 can update an aggregate list of trailer prioritization with the prioritized trailers from the system 528. In some implementations, the trailer prioritization system 524 can receive the determination of which items are out of stock from the system 528 and the system 524 can prioritize trailers having the same IRD based on that determination.

Figure 6A:
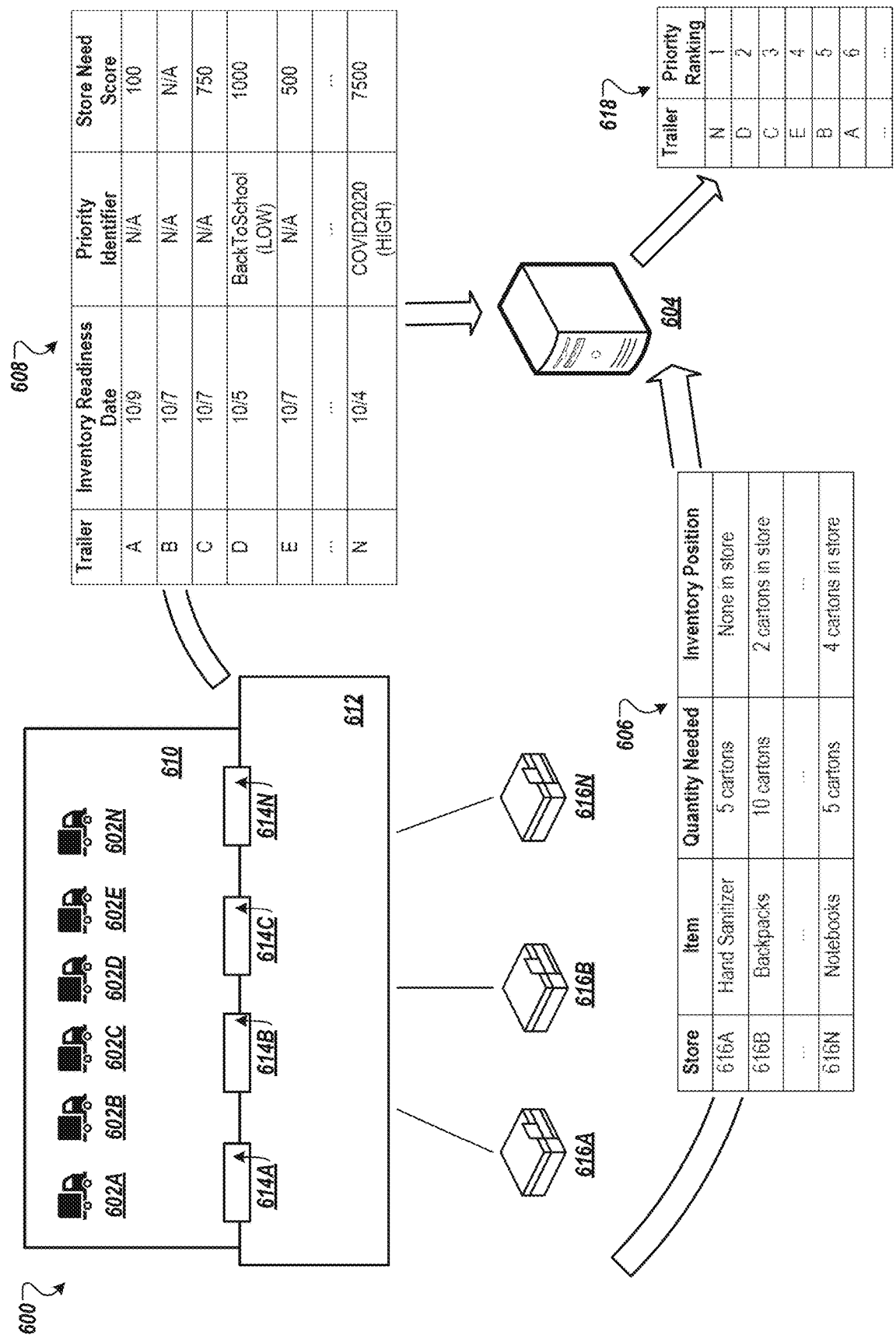
FIGS. 6A-B are schematic diagrams of determining trailer prioritization at a distribution center.
Figure 6B:
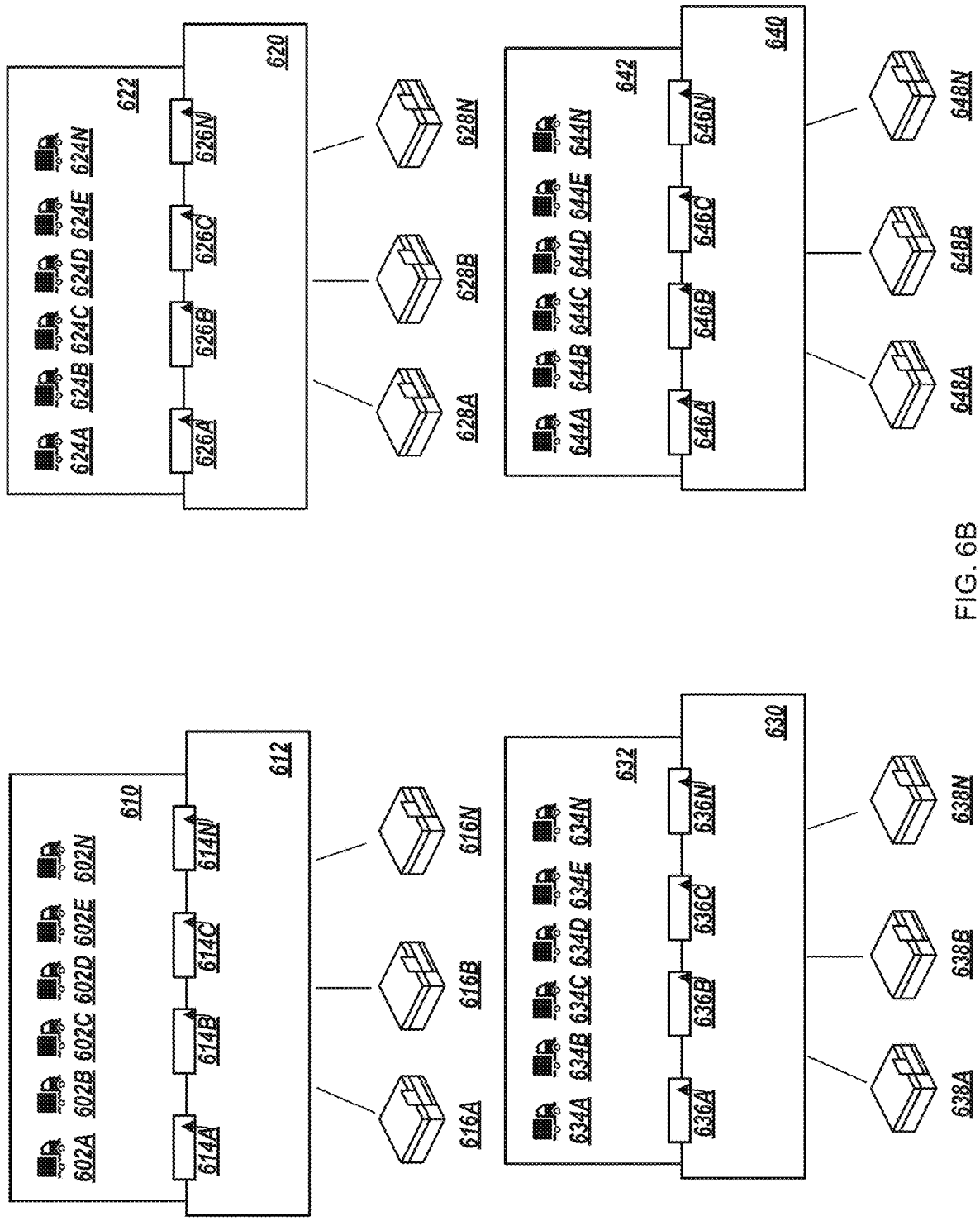

FIGS. 6A-B are schematic diagrams of determining trailer prioritization at a distribution center. In FIG. 6A, system 600 includes a distribution center 612 having a yard 610 and doors 614A-N. One or more trailers 602A-N (e.g., trucks, containers) wait in the yard 610 until they can be unloaded at the doors 614A-N. As depicted, the distribution center 612 services one or more stores 616A-N. For example, the distribution center 612 can service 75-80 stores 616A-N. In some implementations, the distribution center 612 can server more or fewer stores 616A-N. A distribution center computing system at the distribution center 612 can be in communication (e.g., wired and/or wireless) via a network with a computing system 604 (e.g., tracking system 502). In some implementations, the computing system 604 can be the distribution center computing system. The computing system 604 can be configured to generate trailer unloading prioritization lists based, at least in part, on each trailer's IRD, high priority information, and store need information.

As depicted, the computing system 604 can receive information from the distribution center 612 and optionally from the stores 616A-N. The system 604 can receive trailer information 608. The trailer information 608 can identify each of the trailers 602A-N that are waiting in the yard 610 of the distribution center 612. Each trailer 602A-N can be identified by a unique identifier. The trailer information 608 further can include an aggregate inventory readiness date (IRD), priority identifier, and store need score for each of the trailers 602A-N. The aggregate IRD can be determined by the distribution center computing system and transmitted to the computing system 604. In other implementations, the computing system 604 can receive IRDs for all products contained within a particular trailer and then determine an aggregate IRD for that trailer (e.g., refer to FIG. 9).

A trailer that contains items of high priority can have a priority identifier. Trailers that do not contain items of high priority may not have any priority identifier (e.g., indicated as "N/A" in the trailer information 608). The computing system 604 and/or the distribution center computing system can determine whether a trailer has high priority items, as discussed in reference to FIG. 10. In some implementations, the computing system 604 can receive information from one or more other feeds, such as the carrier data feed 508, the vendor data feed 510, the distribution center data feed 512, the store data feed 514, or the order system 504 (e.g., refer to FIG. 5), about whether a trailer contains high priority item(s).

The computing system 604 can determine that a trailer having a priority identifier (which indicates that the trailer contains high priority items) should be prioritized before trailers that have upcoming (e.g., early) IRDs. Items can be marked as high priority, such as hand sanitizer, during a pandemic. In some implementations, categories of items can be marked as high priority, such as fresh produce. High priority categories and/or items can change seasonally and/or based on surrounding conditions. For example, in the Fall season, back to school items can be marked as a high priority category. As another example, during a natural disaster, such as a hurricane, home protection and survival items can be marked as high priority.

Store need score can indicate whether a trailer has items that are marked as needed by one or more of the stores 616A-N. The store need score can be aggregated at the trailer level and based on store need scores for each store 616A-N that is serviced by the distribution center 612. Needed items can include out of stock items. Needed items can also include items that are in low inventory but not yet out of stock in one or more of the stores 616A-N. In other words, the store need score can be an estimate of how much stock of an item is at a store and what an expected remaining need is for a certain period of time. Need at the store level can be based on a sum of sales that the store needs to support and on-hand quantity of an item that needs to be on the shelf for presentation to customers. A quantity of the item already on-hand and/or already on the way to the store can be subtracted from this summation, thereby resulting in a remaining store need value on the store level. Once the remaining store need value for all of the stores are aggregated on the trailer level, the trailers 602A-N can be prioritized based on which trailers can fulfill more of the aggregate store need.

The less stock of an item, the greater need for that item. Thus, in some implementations, store need of one product for a first of the stores 616A-N can be greater than store need of a different product for a second store. The store need for the first store can be weighted more than the store need for the second store when determining the aggregate store need score on the trailer level.

In some implementations, the distribution center computing system can receive information from the stores 616A-N to determine which items in the aggregate are out of stock or low inventory, thereby creating a store need. The distribution center computing system can then review inventory lists of the trailers 602A-N and identify which, if any of the trailers, have items that are of store need. Based on that determination, the distribution center computing system can transmit to the computing system 604 a list of which trailers 602A-N contain particular items that are, in the aggregate, needed across all of the stores 616A-N that are serviced by the distribution center 612. The computing system 604 can use this received information to prioritize trailers having the same IRD based on aggregate store need score. In some implementations, determining the store need score and prioritization based on the store need score can be performed by the computing system 604, which can receive the list of out of stock or low inventory items from the one or more stores 616A-N and/or the distribution center 612.

As depicted in the received trailer information 608, trailer 602A has an IRD of 10/9, no high priority items (as indicated by "N/A" for priority identifier), and has a store need score of 100. Trailer 602B has an IRD of 10/7, no high priority items, and no store need score. No store need score indicates that the trailer 602B does not have any items that the stores 616A-N currently need (e.g., that are out of stock and/or in low inventory). Trailer 602C has an IRD of 10/7, no high priority items, but has a store need score of 750. Trailer 602D has an IRD of 10/5, high priority items (as indicated by "BackToSchool (LOW)" for the priority identifier), and a store need score of 1000. Trailer 602E has an IRD of 10/7, no high priority items, and a store need score of 500. Finally, trailer 602N has an IRD of 10/4, high priority items (as indicated by "COVID2020 (HIGH)" for the priority identifier), and a store need score of 7500.

As mentioned, the computing system 604 receives store need information 606 from the distribution center 612 and/or the stores 616A-N. The store need information 606 can include a store identifier, one or more items that are out of stock, quantity of the out of stock item that is needed, and an inventory position. In some implementations, the computing system 604 can receive a list indicating an aggregate quantity of out of stock or low inventory items across all the stores 616A-N that are serviced by the distribution center 612.

The inventory position can indicate whether a store has some inventory, albeit low, of the identified item(s). For example, if an item is not on the shelf in a store and the store does not have any of the item in inventory (e.g., storage), then the item can be marked as higher priority than the other items. Likewise, if an item is not on the shelf in the store but the store has a limited quantity of the item in inventory, then the item can be marked as a lower priority item in comparison to other items. The inventory position information can be used by the computing system 604 to determine how to prioritize trailers having the same IRD based on a severity of out of stock or low inventory condition of each item.

As depicted in the store need information 606, the store 616A needs 5 cartons of hand sanitizer and the store 616A does not have any hand sanitizer in the store's inventory. This indicates that the hand sanitizer is a high priority item. As a result, any trailers having the same IRD that contain hand sanitizer can be prioritized over trailers having the same IRD that do not contain hand sanitizer. The store 616B needs 10 cartons of backpacks and only has 2 cartons of backpacks in the store's inventory. This indicates that the backpacks are going to be out of stock as soon as the 2 cartons in store are used to stock the shelves in the store 616B. Finally, the store 616N needs 5 cartons of notebooks, however the store 616N has 4 cartons of notebooks in the store's inventory. This indicates that the notebooks are a low priority item because the store 616N has sufficient inventory to fill the shelves for a time being. As a result, trailers having the same IRD that contain notebooks can be unloaded after trailers having the same IRD that contain hand sanitizer (prioritized first) and then backpacks (prioritized second).

As mentioned and described throughout, the store need information 606 can be used by the computing system 604 to determine which trailers having the same IRD also contain low inventory or needed items and should be prioritized, based on how important filling the low inventory items is per store and/or across all stores 616A-N serviced by the distribution center 612 (e.g., if a trailer has hand sanitizer, that trailer can be prioritized over a trailer having notebooks).

In the example of FIG. 6A, the distribution center 612 can service 75 stores 616A-N. Trailer 602N's store need score of 7500 can be based on the trailer 602N having a largest quantity of hand sanitizer. In other words, a higher store need score indicates that the items on the trailer 602N are of high need by all the stores 616A-N that are serviced by the distribution center 612. As shown in the store need information 606, the store 616A has no hand sanitizer and it is a high priority item. To fulfill the store 616A's need for hand sanitizer, trailer 602N can be prioritized first since it has the largest quantity of hand sanitizer. For example, trailer 602N's store need score of 7500 can be a product of a number of hand sanitizers needed per store. Therefore, if all 75 stores 616A-N sell 100 hand sanitizer bottles per day and each of the 75 stores 616A-N need 100 bottles per day, then the trailer 602N's aggregate store need score can equal 7500 (100 needed hand sanitizers multiplied by 75 stores). If one of the stores 616A-N already has 100 hand sanitizers in stock, then that 100 hand sanitizers can be reduced from the aggregate store need score of 7500 (in other words, the store need score for the trailer 602N would be 7400).

The store need score can also be measured based on lead time and/or re-order frequency per store (e.g., how many trailers does each store receive, how far is each store from the distribution center, etc.). The store need score per store can be aggregated up to a trailer level, as represented in the received trailer information 608, even if each of the stores have different lead times, inventory positions, and/or re-order frequencies.

Thus, the computing system 604 can generate an updating trailer unloading prioritization list 618 in which the trailers 602A-N are ordered and/or ranked based on high priority items, IRD, and store need information. The list can be generated based on analyzing the trailer information 608 and the store need information 606, as described herein. Finally, the list 618 can be transmitted and/or outputted to the distribution center system such that the distribution center 612 can begin the prioritized unloading process.

FIG. 6B is a schematic diagram of multiple distribution centers. As depicted, each distribution center 612, 620, 630, and 640 service different stores. For example, distribution center 612 (e.g., refer to distribution center 612 in FIG. 6A) services the stores 616A-N. The distribution center 612 also has trailers 602A-N waiting in the yard 610 to be unloaded via the doorways 614A-N. Distribution center 620 services stores 628A-N and has trailers 624A-N waiting in yard 622 to be unloaded via doorways 626A-N. Distribution center 630 services stores 638-N and has trailers 634A-N waiting in yard 632 to be unloaded via doorways 636A-N. Distribution center 640 services stores 648A-N and has trailers 6644A-N waiting in yard 642 to be unloaded via doorways 646A-N.

Since each distribution center services a different set of stores, store need information, as described in reference to FIG. 6A, can be based on combined stock information for items in only stores serviced by the particular distribution center. For example, as depicted in FIG. 6A, hand sanitizer, backpacks, and notebooks can be items in greater need for stores 616A-N, which are serviced by the distribution center 612. Different items, such as facemasks, pens, and latex gloves, can be items in more need for stores 628A-N, which are serviced only by the distribution center 620. In other examples, the different sets of stores can have different aggregate lead times and/or re-order frequencies. Moreover, each set of stores can carry different items, thereby creating different store need and/or prioritization. As a result, the computing system 604 can make determinations about prioritizing trailers specific to the needs of a particular distribution center and the stores it services.

Figure 7:
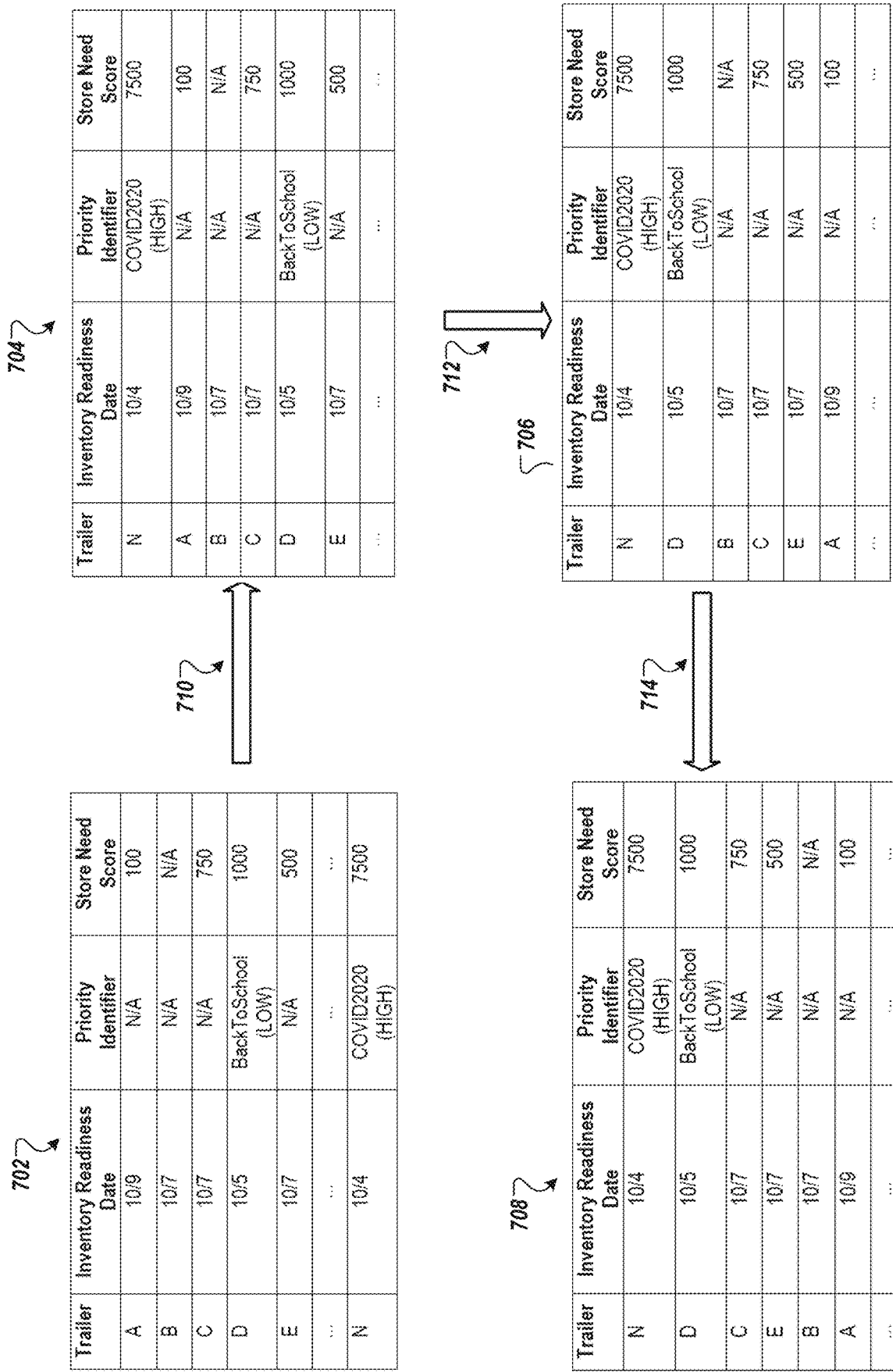
FIG. 7 is a schematic diagram of prioritizing trailers.

FIG. 7 is a schematic diagram of prioritizing trailers. As described herein, a computing system (e.g., the computing system 604 in FIG. 6A) receives trailer information 702 from a distribution center (e.g., distribution center computing system). The trailer information 702 indicates a list of all trailers at the distribution center that are in a yard waiting to be unloaded (e.g., refer to FIG. 6A). The trailers in the trailer information 702 are not yet prioritized. A first prioritization process 710 is performed by the computing system on the trailer information 702. As a result, trailer information 704 indicates the trailers prioritized based on whether any one of the trailers have high priority items. During the first prioritization process 710, the computing system determines whether any of the trailers A-N have a priority identifier. As depicted in the trailer information 704, only trailer A having a high priority identifier ("COVID2020 (HIGH)") is prioritized. Trailer D has a low priority identifier ("BackToSchool (LOW)") and is not prioritized above any of the other trailers during the first prioritization process 710. In other examples, the computing system can be configured to prioritize all trailers having any priority identifier, whether high or low. The computing system can be configured to only prioritize high priority trailers during the process 710 based at least in part on surrounding conditions. For example, during a national pandemic, items relating to sanitation and health may be of the highest priority, even though other items are also considered to be priority items. As another example, during normal seasonal conditions, back to school items can be equally prioritized with medicine for colds and flu. In the second example, trailers having either back to school items or medicine for colds and flu can be prioritized during the first prioritization process 710.

A second prioritization process 712 is performed on the trailer information 704. As a result, trailer information 706 indicates the trailers that were not prioritized during the first prioritization process 710 are now prioritized based on the trailer IRDs. The trailers can be prioritized based on earliest to latest IRD. As depicted in the trailer information 706, trailer N remains prioritized at the top of the list because it has a high priority identifier. Trailer D has been prioritized as second on the list during the process 712 because it has an IRD of 10/5. Trailers B, C, and E have been prioritized as third, fourth, and fifth on the list because they have the same IRD of 10/7. Trailer A has been prioritized as last on the list because it has the latest IRD of 10/9.

A third prioritization process 714 is performed on the trailer information 706. As a result, trailer information 708 indicates that trailers having the same IRD are further prioritized based on which of those trailers contain needed items. The store need information is specific to stores that are serviced by a particular distribution center, as discussed in reference to FIGS. 6A-B. In other words, the trailers B, C, and E are prioritized based on items that are needed only in the stores that are serviced by the distribution center that these trailers are located at.

The trailer information 708 indicates that after the process 714, trailers N and D remain as first and second on the prioritization list. Trailers B, C, E have been reprioritized based on store need information since they have the same IRD. Referring back to FIG. 6A, store need information 606 indicates that a greater quantity of backpacks are required from the stores 616A-N than notebooks. Therefore, as a result of the process 714, trailer C has been prioritized over trailers B and E because trailer C has a store need score of 750, where the store need score of 750 pertains to a quantity of backpacks that the trailer C has. Trailer E is prioritized after trailer C based on trailer E's store need score of 500. The store need score of 500 can pertain to 500 notebooks that the trailer E can fulfill. Therefore, since trailer E has a lower store need score and a less high priority item that is needed by the stores, trailer E is prioritized after trailer C. Finally, because trailer B contains no needed items (in other words, trailer B has a store need score of N/A or 0), it is listed after trailers C and E. Even though trailer B does not contain any needed items, it is still prioritized above trailer A, which contains needed items, because trailer B has an earlier IRD than trailer A.

As a result of the prioritization processes 710, 712, and 714, a final prioritization list is made and transmitted to the distribution center. Using the final list, the trailers A-N can be unloaded more efficiently in the distribution center to satisfy high priority demands and IRDs and to avoid out of stock or low inventory scenarios in stores that are serviced by the distribution center. Moreover, as described throughout this disclosure, processes 710, 712, and 714 can be performed for each distribution center in a supply chain.

Figure 8:
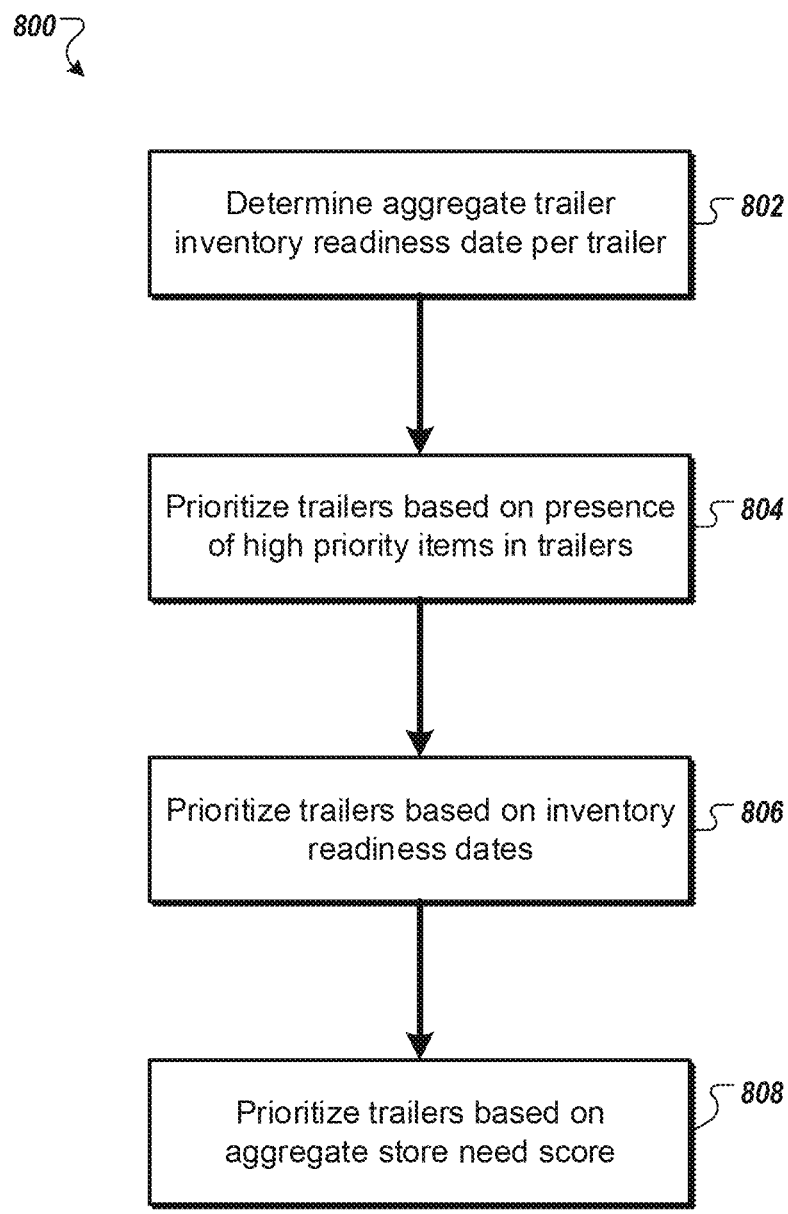
FIG. 8 is a flowchart of a process for prioritizing trailers.

FIG. 8 is a flowchart of a process 800 for prioritizing trailers. The process 800 can be performed by a computing system as described herein (e.g., the computing system 604). In step 802, the computing system determines an aggregate trailer inventory readiness date (IRD) for each trailer (e.g., refer to FIG. 9).

Figure 10:
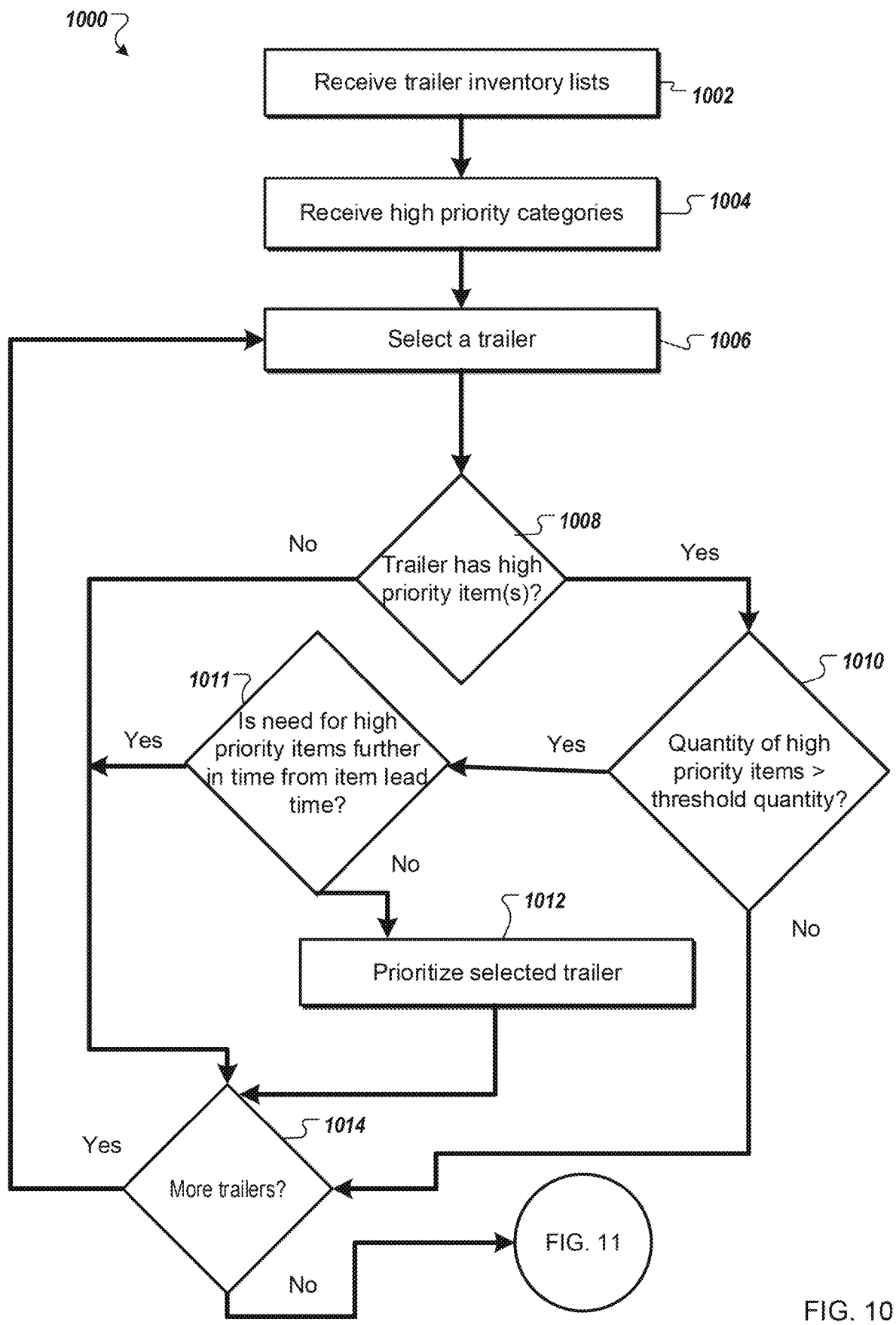
FIG. 10 is a flowchart of a process for prioritizing trailers based on high priority items.

Next, the computing system prioritizes the trailers based on a presence of high priority items in the trailers (step 804) (e.g., refer to FIG. 10).

Figure 11:
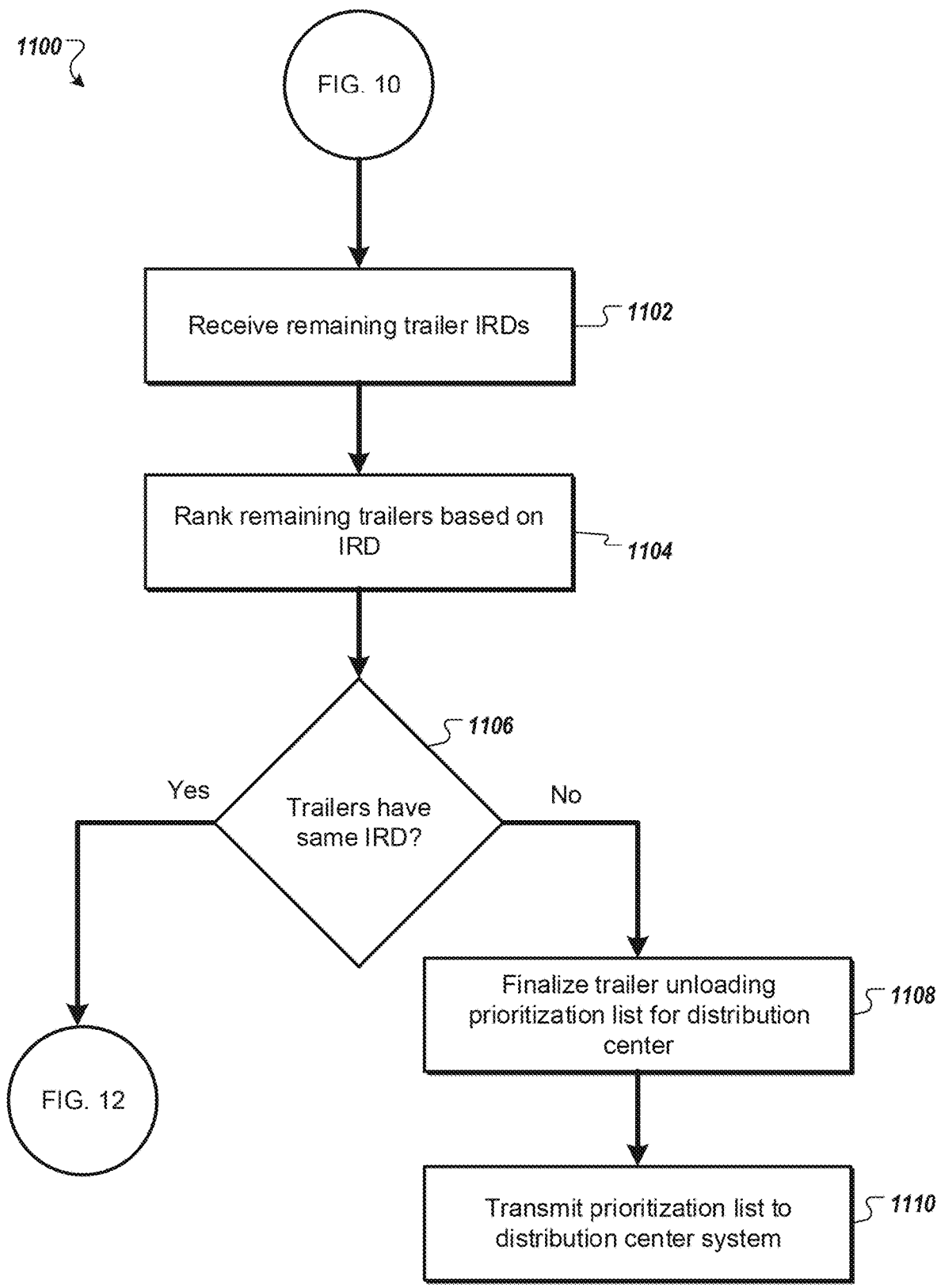
FIG. 11 is a flowchart of a process for prioritizing non-prioritized trailers based on inventory ready date.

The trailers that are not prioritized in step 804 are then prioritized based on IRD in step 806 (e.g., refer to FIG. 11). In some implementations, if one or more trailers have high priority items, those trailers can be further prioritized based on IRD. In implementations where one trailer has high priority items, that trailer is prioritized first and all remaining trailers are prioritized based on their IRDs. In such an example, even if one or more of the remaining trailers has an IRD that is earlier than the IRD of the trailer having high priority items, the trailer having the high priority items is still prioritized first. In implementations, where no trailer has high priority items, all trailers are prioritized based on IRD.

Figure 12:
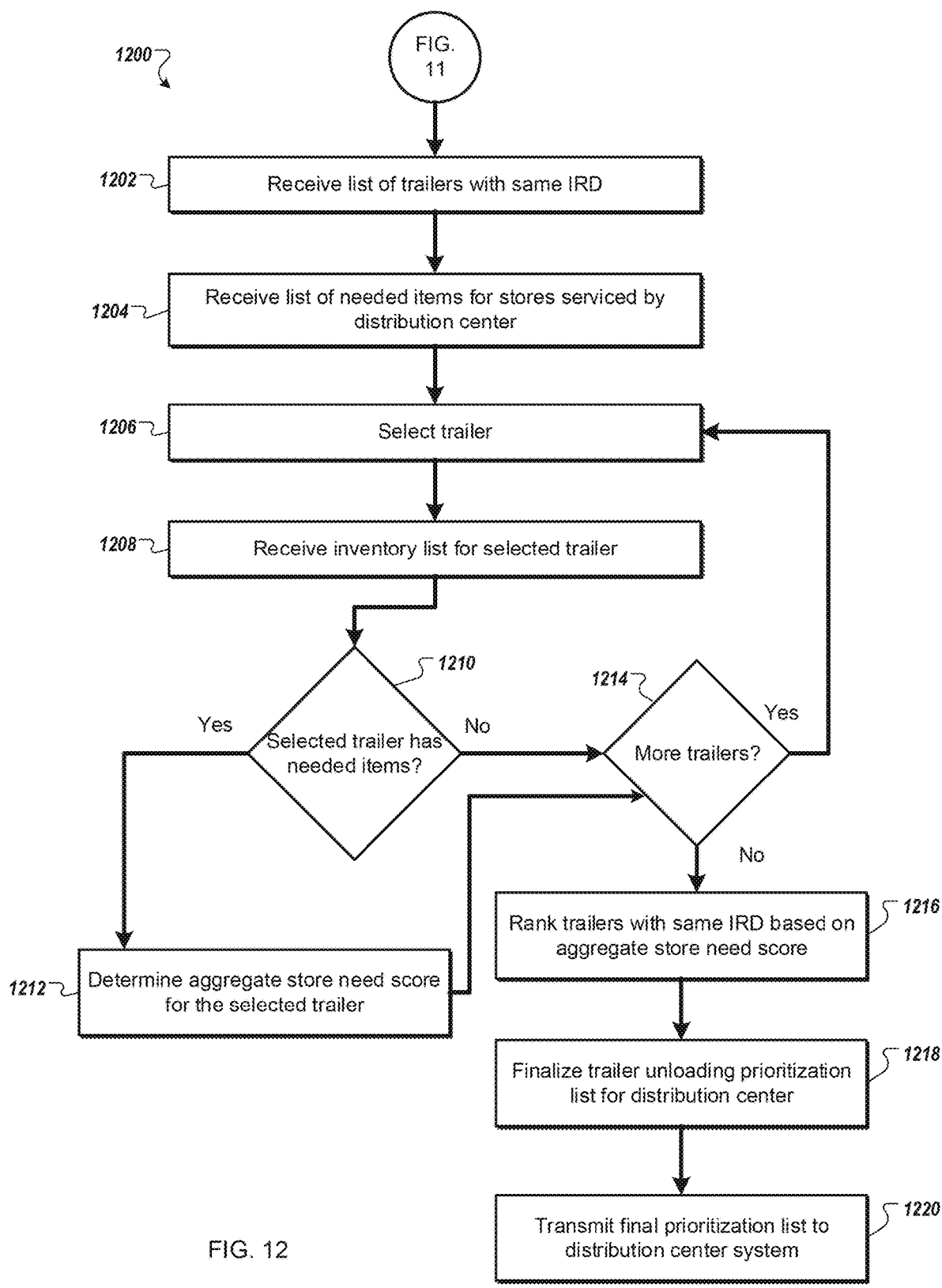
FIG. 12 is a flowchart of a process for prioritizing trailers with the same inventory ready date based on store need information from stores serviced by a distribution center.

Finally, in step 808, trailers having the same IRD are further prioritized based on presence of needed items in those trailers, based on aggregate store need score per trailer (e.g., refer to FIG. 12). Trailers that are prioritized in step 804 based on high priority items are not prioritized again in step 808. Instead, only trailers having the same IRD can be prioritized in step 808. As a result, even if a trailer having a later IRD contains needed items, that trailer will be prioritized after one or more trailers having the same IRD, where none or one or more of the trailers having the same IRD contain needed items. Prioritization based on needed items and IRD is advantageous to ensure that trailers are unloaded to fulfill IRDs and also to prevent out of stock or low inventory scenarios from occurring in stores that are serviced by the distribution center.

Figure 9:
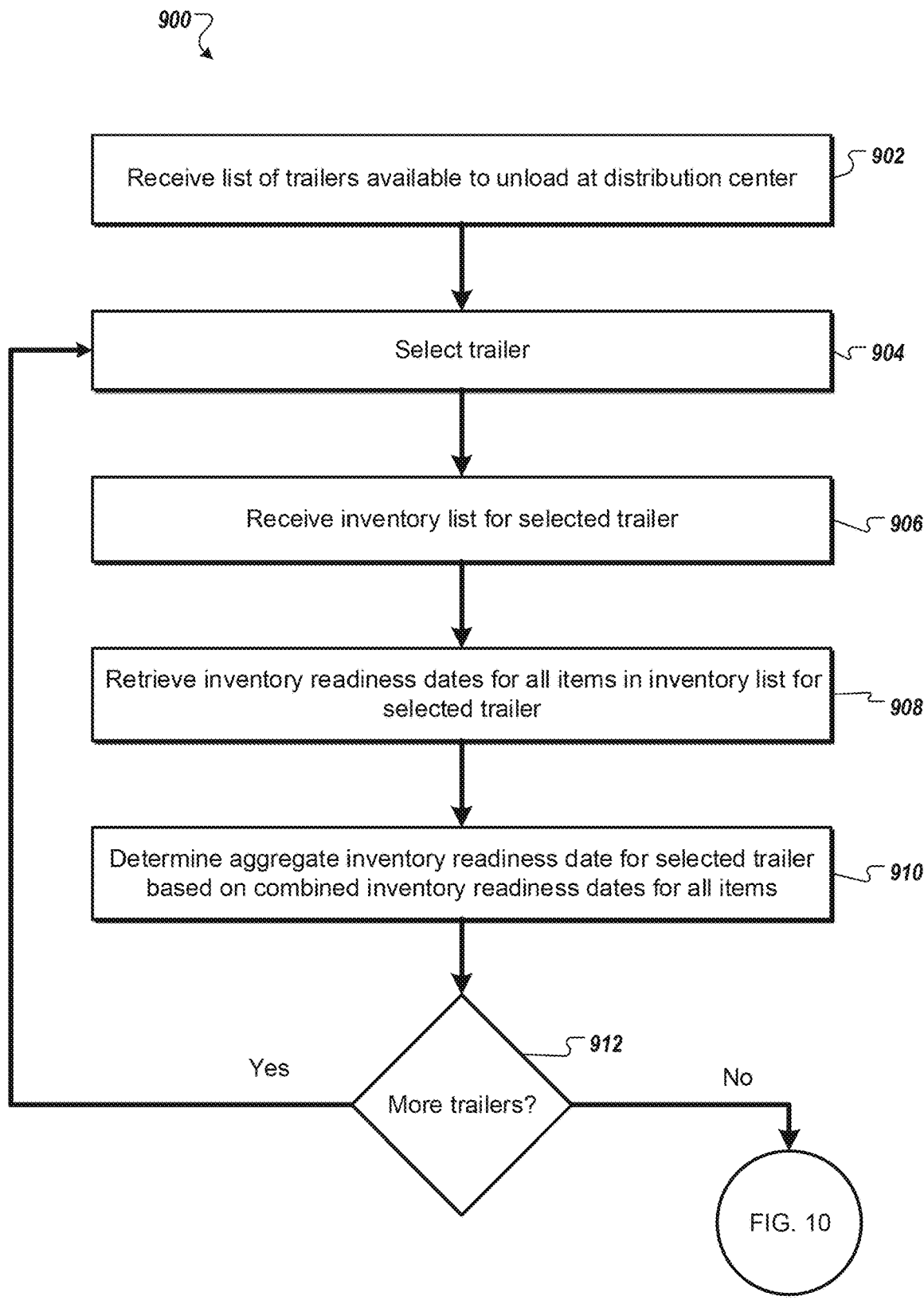
FIG. 9 is a flowchart of a process for determining trailer inventory ready dates.

FIG. 9 is a flowchart of a process 900 for determining trailer inventory ready dates (IRDs) (e.g., refer to step 802 in FIG. 8). The process 900 can be performed by a computing system, as described and depicted herein. The computing system can receive a list of trailers available to unload at a distribution center (step 902). The list can be received from a distribution center computing system. Next, the computing system can select a trailer from the list of trailers (step 904). An inventory list for the selected trailer can be received by the computing system in step 906. The inventory list can indicate items and item quantities for all items that are contained within the trailer. The list can be received from the vendor data feed 510 in FIG. 5 or any other components and/or feeds described herein.

In step 908, the computing system can retrieve IRDs for all items in the inventory list for the selected trailer. The IRDs can be looked up in a database and/or received from components such as the IRD generator 506 depicted in FIG. 5.

The computing system can then determine an aggregate IRD for the selected trailer based on the combined IRDs for all the items in the selected trailer (step 910). The computing system can determine the aggregate IRD based on any one or combination of an average or mean of IRDs for all the items in the selected trailer. For example, a weighted unit average can be used across all the items in the selected trailer. Each item can have an IRD at the destination distribution center. Those IRDs can be weighted based on how many units of each item are on the selected trailer. As an illustrative example, if the selected trailer has 100 items and 1 of those items has 1000 units while the other 99 items each have 10 units, the IRD for the selected trailer can be weighted more in favor of the 1 item having 1000 units.

As mentioned, each item and/or category of items in the selected trailer can have a different IRD. As another example, 20% of the items can have an IRD of October 5, 20% of the items can have an IRD of October 9, 40% of the items can have an IRD of October 10, and 20% of the items can have an IRD of October 11. Averaging these IRDs can result in October 10 being an aggregate IRD for the selected trailer. In some implementations, the aggrgeate IRD can be based on averaging the item IRDs and weighting them based on value of the items.

The aggregate IRD for the selected trailer is then used by the computing system to prioritize the trailers at the distribution center. In other implementations, the computing system can determine an aggregate IRD for the selected trailer by taking an earliest IRD of items within the trailer (e.g., the min). Taking the earliest IRD as the aggregate IRD for the trailer can ensure that as long as the trailer is brought into the distribution center on time for the earliest IRD, then no other items in the trailer may be late. The computing system can also determine the aggregate IRD by taking a latest IRD of items within the trailer, a maximum IRD of items within the trailer, a minimum IRD of items within the trailer, a mean IRD of items within the trailer, or any other statistical method to generate an aggregate IRD. One or more of these statistical methods can be combined to generate the aggregate IRD for the selected trailer. Moreover, the aggregate IRD can be based on an average of retail sales value for the items on the trailer, a margin of the trailer, an average of purchase orders and/or shipment levels for the items on the trailer, and/or a future forecast or sales projections.

Once the IRD is determined for the selected trailer, the computing system can determine whether there are additional trailers at the distribution center (step 912). If there are, then the steps 904-910 are repeated to determine an aggregate IRD for each of the remaining trailers. If there are no more trailers at the distribution center, then the computing system can begin prioritizing the trailers at the distribution center (e.g., refer to FIG. 10).

FIG. 10 is a flowchart of a process 1000 for prioritizing trailers based on high priority items (e.g., refer to step 804 in FIG. 8). The process 1000 can be performed by a computing system, as described and depicted herein. For example, the process 1000 can be performed by the trailer prioritization system 524 depicted in FIG. 5. In step 1002, the computing system can receive inventory lists for each of the trailers at a distribution center. As described throughout, the inventory lists can be received from one or more components, including but not limited to a database, a distribution center computing system, the order system 504, the carrier data feed 508, the vendor data feed 510, and/or the distribution center data feed 512.

In step 1004, the computing system receives a list of high priority categories. The high priority categories can change seasonally (e.g., back to school in the Fall, Black Friday deals, key advertised items) and/or based on surrounding conditions (e.g., natural disaster, pandemic, national emergency). The list of high priority categories can be received from and/or generated by the distribution center computing system. In other implementations, the list of high priority categories can be received from one or more stores that are serviced by the distribution center. Moreover, the list of high priority categories can be generated and received from inventory management teams for one or more of the stores serviced by the distribution center.

The computing system can receive high priority information from one or more sources and determine an overall order of high priority items. For example, face masks, hand sanitizer, backpacks, and notebooks can be indicated as high priority items. Based on one or more conditions (e.g., seasonal conditions, emergencies), the computing system can further prioritize the high priority items. Where a national emergency such as a pandemic exists, the computing system can be configured to prioritize face masks and hand sanitizer over the backpacks and notebooks. As a result, the face masks and hand sanitizer can be marked as the first and second highest priority items and the backpacks and notebooks can be marked as the third and fourth highest priority items. High priority items can be further categorized into different groupings, such as crisis, sensitive, and seasonal. Items that are categorized as crisis can be further categorized based on how critical those items are.

Next, the computing system can select a trailer from the trailers at the distribution center (step 1006). Based on the inventory list (received in step 1002) associated with the selected trailer, the computing system can determine whether the selected trailer has high priority items in step 1008. The computing system can compare the inventory list of the selected trailer to the list of high priority categories/items from step 1004.

If the trailer has one or more high priority items, then in step 1010, it can be determined whether a quantity of high priority items on the trailer exceeds a threshold quantity. The threshold quantity can be 25%. Therefore, if 25% of the trailer's items are high priority items, then the trailer may be prioritized in 1012, depending on whether the high priority item is also a timely priority.

If the quantity of high priority items exceeds the threshold quantity in 1010, it can be determined whether a need for the high priority items is further in time from a lead time of such high priority item(s) (1011). In other words, if the high priority items are needed earlier than their lead time, then the items are truly high priority and needed earlier in time. Thus, the trailer should be prioritized in 1012. If the trailer has more than 25% of a high priority item but that item is not in fact needed by stores until after the lead time for that item (e.g., the stores have medium to high inventory of the high priority item, which can be enough to fulfill the stores' needs until the next delivery of the item), then the trailer may not be prioritized in 1012. After all, there is no urgency to get the high priority item to the stores before the item's lead time.

Returning to step 1010, if, in this example, less than 25% of the trailer's items are of one high priority category, then the trailer may not be prioritized and instead it can be determined whether there are more trailers in 1014.

In some implementations, the threshold quantity used in step 1010 can be different. The threshold quantity can be based on one or more different conditions in one or more of the stores, distribution centers, and/or sets of stores that are serviced by a distribution center. The threshold quantity can be different based on seasonal changes and/or what is considered high priority at an given time. For example, if over 25% of the trailer's contents are fresh produce, the trailer can be prioritized in 1012. After all, if the fresh produce is not prioritized, then the produce can go bad/spoil. As another example, if during Black Friday, over 25% of the trailer's contents are electronics having Black Friday deals, the trailer can be prioritized in 1012 in order to ensure Black Friday demand can be met at the stores serviced by the distribution center.

After the selected trailer is prioritized in 1012, the computing system can determine whether there are more trailers at the distribution center in step 1014. If there are, then steps 1006-1014 can be repeated. If there are no more trailers at the distribution center, then the computing system can begin prioritizing trailers based on IRD, where trailers that were prioritized based on high priority items are not prioritized based on IRD (e.g., refer to FIG. 11).

In some implementations, if multiple trailers have high priority items, those trailers can be further prioritized based on the trailer IRD and/or a quantity of the high priority items that each trailer contains. For example, if a first trailer has 10 cartons of hand sanitizer, a high priority item, and a second trailer has 5 cartons of hand sanitizer, the first trailer can be prioritized over the second trailer because it has a greater quantity of the high priority item. As another example, if the first trailer has 10 cartons of hand sanitizer and an IRD of October 10 and the second trailer has 5 cartons of hand sanitizer and an IRD of October 6, the second trailer can be prioritized over the first trailer because it has an earlier IRD. The first trailer can be prioritized after the second trailer and any remaining trailers in the distribution center can be prioritized after the first trailer, even if any of the remaining trailers have an IRD before the first trailer. As a result, trailers having high priority items are still prioritized first to ensure that the high priority items are delivered on time to stores that are serviced by the distribution center. In yet other implementations (e.g., refer to FIGS. 6A-B, 7), trailers having priority items that are identified as low priority may not be prioritized with trailers having priority items that are identified as high priority. Rather, trailers having low priority items can be prioritized with trailers having no priority items and based on IRD and/or store need information.

Referring back to step 1008, if the computing system determines that the selected trailer does not have high priority items, the computing system can determine whether there are more trailers in 1014. If there are more trailers, steps 1006-1014 are repeated. If there are no more trailers at the distribution center, then the computing system can prioritize trailers that are not prioritized in the process 1000 based on the trailers' IRDs (e.g., refer to FIG. 11).

An advantage of the processes 1000 can be to limit prioritizing a trailer if the trailer contains items that may not be needed for a while. For example, if stores serviced by the distribution center are undergoing a transition in which new items will go into the store, then a trailer containing those new items may not be prioritized first depending on how long the transition process may be. For example, this trailer may not be prioritized for another 7 days if the new items on the trailer are not needed immediately by the stores (e.g., because the transition process will take 7 or more days). This trailer should not be prioritized too early. Instead, trailers having high priority items that are needed more immediately can be prioritized first.

FIG. 11 is a flowchart of a process 1100 for prioritizing non-prioritized trailers based on inventory ready date (IRD). The process 1100 can be performed by a computing system, as described throughout this disclosure. Trailers that were prioritized in FIG. 10 based on having high priority items or quantities of items that exceed the predetermined threshold quantity are not prioritized in FIG. 11. As a result, trailers that do not have high priority items are prioritized based on their IRDs during the process 1100.

In step 1102, the computing system receives the IRDs of trailers that were not prioritized in the process 1000. The IRDs are the aggregate IRDs that were generated by the process 900 (e.g., refer to FIG. 9). The computing system ranks the trailers based on their IRDs in step 1104. For example, trailers having earlier aggregate IRDs are prioritized for unloading before trailers having later aggregate IRDs. As described herein, trailers having high priority items can also be ranked amongst each other based on their trailer IRDs. In step 1106, the computing system determines whether one or more trailers have the same IRD. If they do, then the computing system prioritizes the trailers with the same IRD based on store need information (e.g., refer to FIG. 12). If no trailers have the same IRD, then the computing system can finalize a trailer unloading prioritization list for the distribution center (step 1108).

Finalizing the trailer unloading prioritization list can include combining into one list the trailers that were prioritized based on having high priority items and/or quantities of items exceeding the predetermined threshold and the remaining trailers that are ranked based on IRD. For example, a trailer B can be prioritized first because it contains high priority items. A trailer A is prioritized second because it contains a quantity of items that exceeds a predetermined threshold quantity. Trailers C, D, and E, which are ranked against each other based on IRD, are added to the prioritization list, where E is prioritized third (because E has an earlier IRD than D and C), D is prioritized fourth, and C is prioritized fifth (because C has a later IRD than E and D).

Once the prioritization list is finalized in step 1108, the list can be transmitted to a distribution center computing system in step 1110. Transmitting the list can further include outputting the list at the distribution center computing system. In some implementations, the list can be outputted at a computing device (e.g., mobile device) of a user in the distribution center. For example, a distribution center manager/operator can receive the prioritized list on a device such as a tablet or smartphone and begin the trailer unloading process according to the received list.

FIG. 12 is a flowchart of a process 1200 for prioritizing trailers with the same inventory ready date (IRD) based on aggregate store need information from stores serviced by a distribution center (e.g., refer to FIG. 6A). The process 1200 can be performed by a computing system, as described throughout this disclosure. The process 1200 can be performed on trailers having the same IRD. As a result, trailers that are already prioritized in the process 1000 based on high priority items and/or quantity of items exceeding a predetermined threshold quantity are not further prioritized by the process 1200.

First, in step 1202, the computing system can receive a list of trailers that have the same IRD (e.g., refer to step 1106 in FIG. 11). The computing system receives a list of needed items from stores serviced by the distribution center in step 1204. The list of needed items can list items that are actually out of stock in one or more of the stores. The list can also indicate items that are of low stock and will be out of stock in a certain amount of time. For example, the list can indicate a store, an item, a quantity of the item that is needed, and whether the store has any inventory of the item (e.g., refer to FIG. 6A). If the store has no inventory of the item, then the item is actually out of stock in that store. If the store has low inventory of the item, then the item is determined to be going out of stock in a certain amount of time. In other implementations, the list can also indicate whether the distribution center has inventory in out of stock items and/or items that are going to be out of stock in a certain amount of time. In yet other implementations, the list of out of stock information can list items in the aggregate across all stores serviced by the distribution center that are out of stock. The list of needed items is beneficial for the computing system to determine which trailers to prioritize.

In some implementations, the computing system can receive lists of needed items from each store that is serviced by the distribution center (e.g., refer to FIG. 6A). The computing system can then aggregate a number of stores that are out of stock and/or prioritize out of stock items based on the number of stores out of stock and/or quantities of the out of stock item per store and/or across all stores serviced by the distribution center. In yet other implementations, the computing system can receive, from a distribution center computing system, an aggregate list of needed items across all stores serviced by the distribution center. As described throughout this disclosure, the list of needed items may only include items in stores that are serviced by a particular distribution center. In other words, stores serviced by a first distribution center can have a list of different items than stores serviced by a second distribution center. In prioritizing trailers at the first distribution center, the computing system only considers the list of items for stores serviced by the first distribution center, not the second distribution center.

Moreover, the computing system can receive inventory position information about each item in a store and/or in the distribution center (e.g., refer to FIG. 6A). Using the inventory position information, the computing system can determine which items are currently out of stock, which items are going to be out of stock (e.g., based on a store and/or the distribution center having low inventory of the items), and which items are not going to be out of stock over a certain period of time. For example, an item can be currently out of stock in a store, however the distribution center can have the item in inventory. Therefore, the computing system would not mark the item as a higher priority and the item would not be used to prioritize the trailers.

The computing system can receive a list of items multiple times during a certain period of time. For example, the computing system can receive an updated list of items 6 times a day—twice in the morning, twice in the afternoon prior to prioritization planning for the afternoon, and twice in the evening prior to prioritization planning for the evening. Additionally and/or alternatively, the computing system can receive real-time inventory updates/data from the stores serviced by the distribution center. As a result, the computing system can dynamically adjust prioritization lists based on changing conditions in real-time and projected scenarios at one or more of the stores serviced by the distribution center.

Still referring to FIG. 12, in step 1206, the computing system can select a trailer from the trailers at the distribution center. In step 1208, the computing system can receive an inventory list for the selected trailer, as described above. The computing system determines whether the selected trailer contains needed items in step 1210. As described above, the computing system can compare items in the selected trailer's inventory list to items in the list of needed items received in step 1204. If the selected trailer does not contain the needed items, then the computing system determines whether there are more trailers at the distribution center in step 1214. If there are, steps 1206-1214 are repeated. If there are not, the computing system proceeds to step 1216, which is discussed below.

If the selected truck contains needed items, the computing system can determine a quantity of the needed items in the selected trailer and assign an aggregate store need score to the selected trailer, as described in reference to FIG. 6A (step 1212). The store need score can be determined at least in part on a quantity of the needed item in the selected trailer. The store need score can also be determined based on comparing the quantity of the needed item in the selected truck to a quantity of the needed item required by one or more stores serviced by the distribution center. For example, if a first store requires 10 units of computer screens and trailer A has 10 units of computer screens, trailer A can receive a higher store need score than a trailer B, which has only 2 units of computer screens. As another example, if trailer A has 10 units of computer screens, an item that has a very low inventory in the first store, and trailer B has 2 units of keyboards, an item that is actually out of stock in the first store (or any store serviced by the distribution center), then the computing system can assign a higher store need score to trailer B than trailer A. A trailer having a higher store need score can be prioritized over trailers having lower store need scores or no store need scores. Moreover, the aggregate store need score can be weighted based on need of one or more items in one or more of the stores serviced by the distribution center and/or a quantity of each needed item on the trailer relative to each other (e.g., refer to FIG. 6A).

The store need score can be a numeric value indicating a proportion of the selected trailer that has needed items (e.g., if 50% of the items in the trailer are needed items, then the trailer can be assigned a store need score of 50). The store need score can also indicate a severity of a need condition in one or more stores serviced by the distribution center (e.g., the trailer can contain 50% of out of stock items and a store serviced by the distribution center can require a large quantity of the item and have no inventory of that item, so the trailer is assigned a store need score of 100; a trailer containing less than 50% of an out of stock item can still receive a high store need score if a store requires a large quantity of the item and has no inventory of that item). In some implementations, the computing system can assign an out of stock condition (e.g., binary value) to a trailer having out of stock items (e.g., a trailer has out of stock items, no matter a quantity of the item(s), so the trailer is assigned a value of 1 or "True", whereas a trailer that has no out of stock items is assigned a value of 0 or "False").

Once the quantity of needed items is determined for the selected trailer and an aggregate store need score is assigned to the trailer in step 1212, the computing system can determine whether there are more trailers at the distribution center in step 1214. If there are, then steps 1206-1214 can be repeated. If there are no more trailers, then the computing system ranks the trailers having the same IRD based on their aggregate store need scores (step 1216). As mentioned above (e.g., refer to FIG. 6A), a trailer having a higher aggregate store need score can be prioritized over trailers having lower aggrgeate store need scores or no aggrgeate store need scores.

Once the trailers having the same IRD are ranked, the trailer unloading prioritization list for the distribution center can be finalized in step 1218. The prioritization list is finalized by combining prioritization lists/rankings of trailers having high priority items and/or quantities of items exceeding a predetermined threshold quantity with trailers ranked based on IRD and trailers having the same IRD ranked based on store need information. The final prioritization list is then transmitted to a distribution center computing system in step 1220. As described above, the list can also be outputted at the distribution center computing system and/or at a computing device in communication with the computing system.

Figure 13:
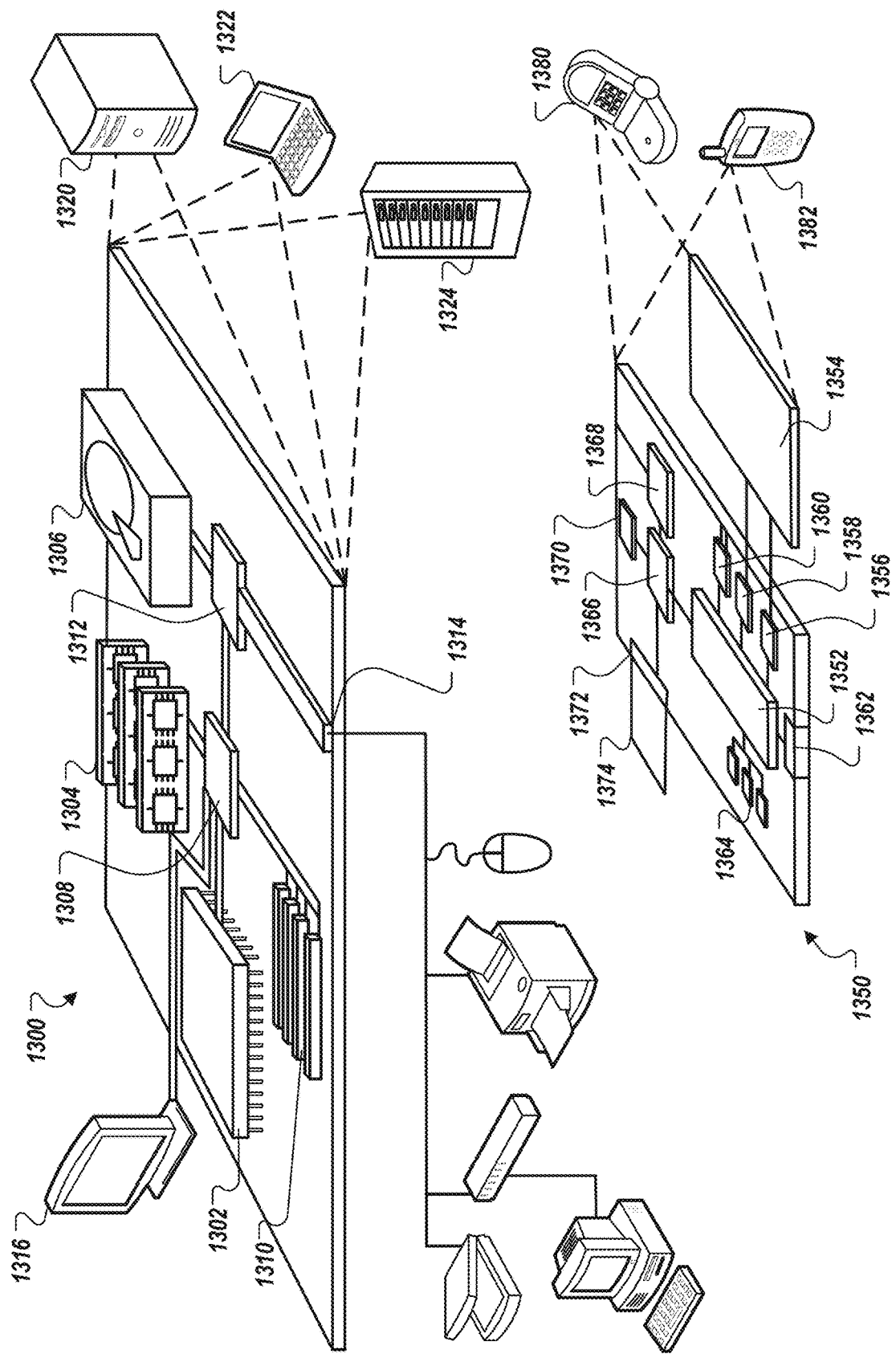
FIG. 13 is a schematic diagram that shows an example of a computing device and a mobile computing device.

FIG. 13 shows an example of a computing device 1300 and an example of a mobile computing device that can be used to implement the techniques described here. The computing device 1300 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1300 includes a processor 1302, a memory 1304, a storage device 1306, a high-speed interface 1308 connecting to the memory 1304 and multiple high-speed expansion ports 1310, and a low-speed interface 1312 connecting to a low-speed expansion port 1314 and the storage device 1306. Each of the processor 1302, the memory 1304, the storage device 1306, the high-speed interface 1308, the high-speed expansion ports 1310, and the low-speed interface 1312, are interconnected using various busses, and can be mounted on a common motherboard or in other manners as appropriate. The processor 1302 can process instructions for execution within the computing device 1300, including instructions stored in the memory 1304 or on the storage device 1306 to display graphical information for a GUI on an external input/output device, such as a display 1316 coupled to the high-speed interface 1308. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1304 stores information within the computing device 1300. In some implementations, the memory 1304 is a volatile memory unit or units. In some implementations, the memory 1304 is a non-volatile memory unit or units. The memory 1304 can also be another form of computer-readable medium, such as a magnetic or optical disk.

The storage device 1306 is capable of providing mass storage for the computing device 1300. In some implementations, the storage device 1306 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1304, the storage device 1306, or memory on the processor 1302.

The high-speed interface 1308 manages bandwidth-intensive operations for the computing device 1300, while the low-speed interface 1312 manages lower bandwidth-intensive operations. Such allocation of functions is exemplary only. In some implementations, the high-speed interface 1308 is coupled to the memory 1304, the display 1316 (e.g., through a graphics processor or accelerator), and to the high-speed expansion ports 1310, which can accept various expansion cards (not shown). In the implementation, the low-speed interface 1312 is coupled to the storage device 1306 and the low-speed expansion port 1314. The low-speed expansion port 1314, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1300 can be implemented in a number of different forms, as shown in the figure. For example, it can be implemented as a standard server 1320, or multiple times in a group of such servers. In addition, it can be implemented in a personal computer such as a laptop computer 1322. It can also be implemented as part of a rack server system 1324. Alternatively, components from the computing device 1300 can be combined with other components in a mobile device (not shown), such as a mobile computing device 1350. Each of such devices can contain one or more of the computing device 1300 and the mobile computing device 1350, and an entire system can be made up of multiple computing devices communicating with each other.

The mobile computing device 1350 includes a processor 1352, a memory 1364, an input/output device such as a display 1354, a communication interface 1366, and a transceiver 1368, among other components. The mobile computing device 1350 can also be provided with a storage device, such as a micro-drive or other device, to provide additional storage. Each of the processor 1352, the memory 1364, the display 1354, the communication interface 1366, and the transceiver 1368, are interconnected using various buses, and several of the components can be mounted on a common motherboard or in other manners as appropriate.

The processor 1352 can execute instructions within the mobile computing device 1350, including instructions stored in the memory 1364. The processor 1352 can be implemented as a chipset of chips that include separate and multiple analog and digital processors. The processor 1352 can provide, for example, for coordination of the other components of the mobile computing device 1350, such as control of user interfaces, applications run by the mobile computing device 1350, and wireless communication by the mobile computing device 1350.

The processor 1352 can communicate with a user through a control interface 1358 and a display interface 1356 coupled to the display 1354. The display 1354 can be, for example, a TFT (Thin-Film-Transistor Liquid Crystal Display) display or an OLED (Organic Light Emitting Diode) display, or other appropriate display technology. The display interface 1356 can comprise appropriate circuitry for driving the display 1354 to present graphical and other information to a user. The control interface 1358 can receive commands from a user and convert them for submission to the processor 1352. In addition, an external interface 1362 can provide communication with the processor 1352, so as to enable near area communication of the mobile computing device 1350 with other devices. The external interface 1362 can provide, for example, for wired communication in some implementations, or for wireless communication in other implementations, and multiple interfaces can also be used.

The memory 1364 stores information within the mobile computing device 1350. The memory 1364 can be implemented as one or more of a computer-readable medium or media, a volatile memory unit or units, or a non-volatile memory unit or units. An expansion memory 1374 can also be provided and connected to the mobile computing device 1350 through an expansion interface 1372, which can include, for example, a SIMM (Single In Line Memory Module) card interface. The expansion memory 1374 can provide extra storage space for the mobile computing device 1350, or can also store applications or other information for the mobile computing device 1350. Specifically, the expansion memory 1374 can include instructions to carry out or supplement the processes described above, and can include secure information also. Thus, for example, the expansion memory 1374 can be provide as a security module for the mobile computing device 1350, and can be programmed with instructions that permit secure use of the mobile computing device 1350. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1364, the expansion memory 1374, or memory on the processor 1352. In some implementations, the computer program product can be received in a propagated signal, for example, over the transceiver 1368 or the external interface 1362.

The mobile computing device 1350 can communicate wirelessly through the communication interface 1366, which can include digital signal processing circuitry where necessary. The communication interface 1366 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1368 using a radio-frequency. In addition, short-range communication can occur, such as using a Bluetooth, WiFi, or other such transceiver (not shown). In addition, a GPS (Global Positioning System) receiver module 1370 can provide additional navigation- and location-related wireless data to the mobile computing device 1350, which can be used as appropriate by applications running on the mobile computing device 1350.

The mobile computing device 1350 can also communicate audibly using an audio codec 1360, which can receive spoken information from a user and convert it to usable digital information. The audio codec 1360 can likewise generate audible sound for a user, such as through a speaker, e.g., in a handset of the mobile computing device 1350. Such sound can include sound from voice telephone calls, can include recorded sound (e.g., voice messages, music files, etc.) and can also include sound generated by applications operating on the mobile computing device 1350.

The mobile computing device 1350 can be implemented in a number of different forms, as shown in the figure. For example, it can be implemented as a cellular telephone 1380. It can also be implemented as part of a smart-phone 1382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Figure 14:
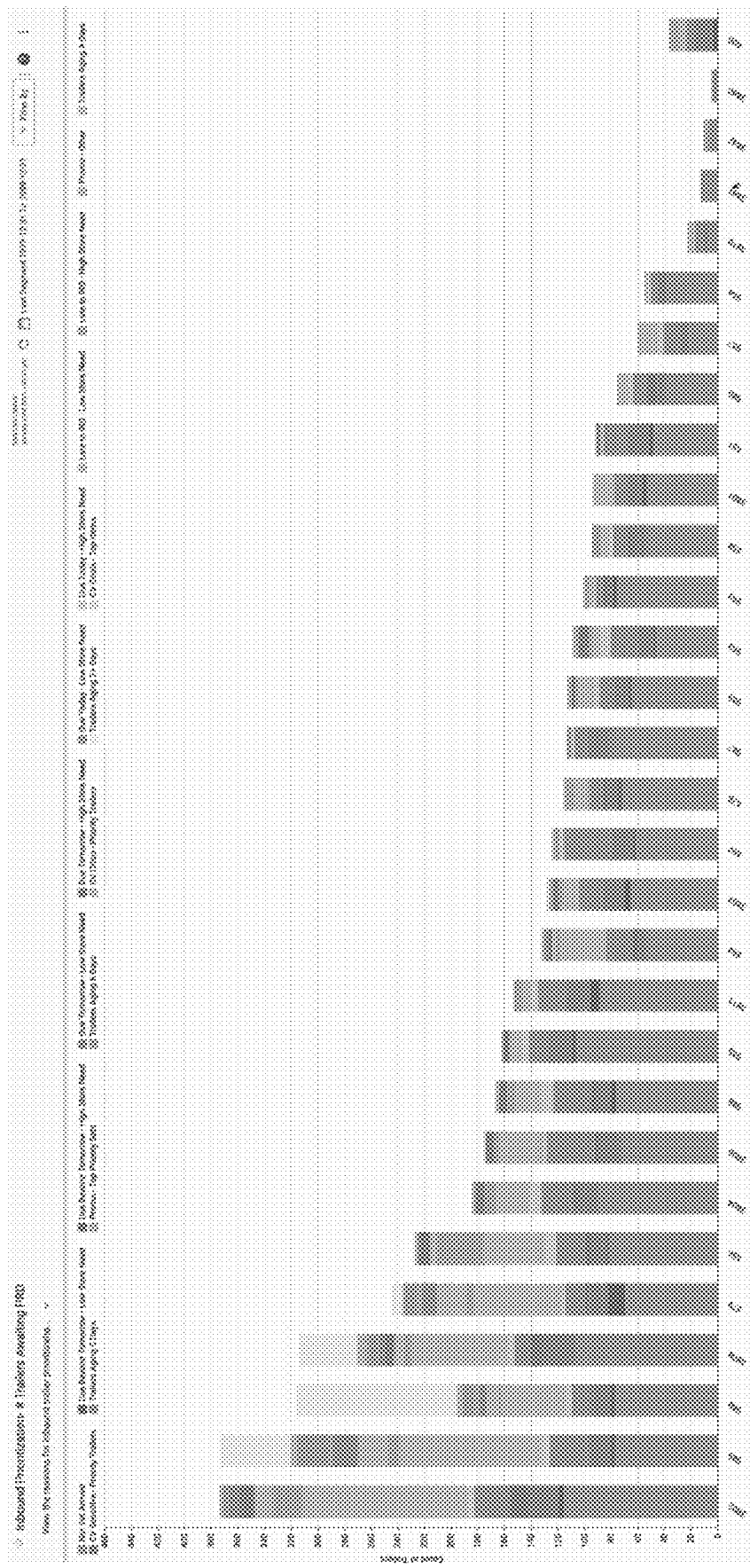
FIG. 14 is a graphical depiction of inbound prioritization trailers.

FIG. 14 is a graphical depiction of inbound prioritization trailers. Graph 1400 demonstrates a number of trailers awaiting prioritization at different distribution centers. An X axis of the graph 1400 represents different distribution centers. A Y axis of the graph 1400 represents a count of trailers per distribution center.

One or more different categories (e.g., color-coded sections of the bars in the graph 1400) can indicate different conditions that are satisfied by the trailers at each of the distribution centers. For example, some of the categories can include not yet arrived, due beyond tomorrow—low store need, due beyond tomorrow—high store need, due tomorrow—low store need, due tomorrow—high store need, due today—low store need, due today—high store need, late to IRD—low store need, late to IRD—high store need, promo—other, trailers aging 4 days, CV sensitive—priority trailers, trailers aging 5 days, promo—top priority sets, trailers aging 6 days, CV crisis—priority trailers, trailers aging 7+ days, and CV crisis—top items. One or more other categories can be used to demonstrate a status of the trailers at each of the distribution centers.

In the example graph 1400, the first distribution center 3802 has a total count of approximately 375 trailers. Of those trailers, approximately 118 trailers have not yet arrived, approximately 20 trailers are due today—low store need, 120 trailers are late to IRD—low store need, and 5 or fewer trailers are CV crisis—priority trailers. In comparison, the last distribution center 600 has a total count of approximately 55 trailers. Of those trailers, approximately 10 trailers are promo—top priority sets, approximately 5-10 trailers are due beyond tomorrow—high store need, and approximately another 5-10 trailers are CV crisis priority trailers.

The information depicted in the graph 1400 can be advantageous to provide an overview of incoming trailers for the supply chain. The overview can be used to better determine how trailers can be prioritized at a distribution center level. As mentioned, each distribution center can service a different set of stores. Therefore, the overview in the graph 1400 can also be advantageous to determine how each of the sets of stores are operating and/or whether they can or will receive items on time. The graph 1400 can therefore provide a holistic view of operations for the supply chain across different distribution centers and the different sets of stores serviced by those distribution centers.

FIG. 15 is another depiction of the inbound prioritization trailers of FIG. 14. Inbound prioritization table 1500 depicts some of the trailers that are assigned to the distribution center 3802, which was described in reference to FIG. 14 as the first distribution center depicted in the graph 1400. Although the distribution center 3802 has approximately 375 trailers, the table 1500 depicts top 4 ranked trailers for the center. The table 1500 can be expanded to depict all of the trailers ranked for the distribution center. The table 1500 of ranked trailers can be generated for each of the distribution centers using the techniques described throughout this document.

The table 1500 depicts a distribution center identifier, a trailer ranking, an appointment number, an indication of whether the trailer is in the yard, an in-yard timestamp, an aggregate IRD for the trailer, total cartons in the trailer, item count for the trailer, a match percent, a category for the trailer, and an aggregate store need score per trailer. One or more additional identifiers or factors can be used in the table 1500 to display the prioritized trailers.

As demonstrated in the example table 1500, trailer having an appointment number 114197 (e.g., a trailer identifier) is ranked first. Therefore, trailer 114197 is of highest priority amongst all the trailers for the distribution center 3802. The trailer 114197 is in the yard as of Jan. 22, 2021 at 8:01 AM. The trailer 114197 has an aggregate IRD of Jan. 24, 2021. This trailer also has 22 cartons and an item count of 2. It also has a match percent of 100%. The trailer 114197 is categorized as CV Crisis—Priority Trailers. Although the trailer 114197 has a store need score of 0, because the trailer is categorized as high priority and a 100% match, the trailer 114197 can be prioritized and ranked first amongst the trailers for distribution center 3802.

Trailer 113042 can be ranked second since it has been in the yard for a longer time, is categorized as Trailer Aging 6 Days, and has a high store need score of 14257. Trailer 113905, which has the same IRD as trailer 113042, can be ranked third, after the trailer 113042, because the trailer 113905 has a significantly lower store need score of 6 (in comparison to trailer 113042's store need score of 14257). Finally, trailer 114613 can be ranked fourth because, even though it has many cartons (120), a CS Sensitive—Priority Trailers category, and a high store need score of 9352, the trailer 114163 arrived only a day before the highest ranked trailer 114197 and the trailer 114163 has a late IRD date of Jan. 23, 2021 and only a 50% match. Therefore, the trailer 114163 is not of high priority before it's IRD and in comparison to the preceding ranked trailers.

The disclosed technology can be applied to different types of nodes in different supply chains. Where distribution center is used throughout this disclosure, the disclosed technology can also be applicable to any variety of nodes in a supply chain, including but not limited to consolidators, ports, de-consolidators (e.g., transshipment operations), upstream distributors, and import warehouses. The disclosed technology can also be operated by third party logistics operators. Moreover, where trailers are used through this disclosure, the trailers can be an example item or container (e.g., ocean container) that can be transported by vessel (e.g., boat, truck, or other vehicle).

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for prioritizing trailers, the method comprising:
receiving, by a trailer prioritization computer system, first tracking data indicating at least one departure event for a first trailer, wherein the tracking data includes data generated by one or more wireless data tags associated with one or more items carried by the first trailer;
determining, by the trailer prioritization computer system, an inventory readiness metric for at least one item carried by the first trailer using the received tracking data;
receiving, by the trailer prioritization system, second tracking data for the first trailer, the second tracking data being received at a later point in time than the first tracking data;
updating the inventory readiness metric for the at least one item carried by the first trailer using the second tracking data;
receiving, by the trailer prioritization computer system and from a plurality of store computer systems, real-time store inventory data for store item inventory for a plurality of store locations;
listening, by the trailer prioritization computer system, for events indicating that trailers have physically arrived at distribution centers in a network of distribution centers;
receiving, by the trailer prioritization system and based on listening for the events, an event indicating that the first trailer has arrived at a first distribution center in the network of distribution centers, wherein the event comprises a GPS location heartbeat message;
identifying, by the trailer prioritization system and based on the received event, the first distribution center where the first trailer arrived;

in response to receiving the event, performing the following operations to generate prioritization instructions for unloading trailers at the first distribution center:

retrieving, by the trailer prioritization computer system and from a supply chain tracking computer system, data elements that correspond to a plurality of trailers awaiting to be unloaded at the first distribution center in the network of distribution centers, wherein the plurality of trailers includes the first trailer indicated by the received event;

determining, by the trailer prioritization computer system and for each trailer of the plurality of trailers, an aggregate inventory readiness date, wherein the aggregate inventory readiness date is an aggregation of inventory readiness dates for all items in the trailer, and wherein the aggregate inventory readiness data is determined using the updated inventory readiness metric for the at least one item carried by the first trailer;

selecting, by the trailer prioritization computer system, a first portion of the data elements corresponding to trailers that satisfy high priority items criteria;

ranking, by the trailer prioritization computer system, the first portion of the data elements into a high priority list of data elements, wherein the ranking of the first portion of the data elements in the high priority list identifies an order for the trailers to be unloaded at the first distribution center based on information indicating high priority items for the trailers in the high priority list;

selecting, by the trailer prioritization computer system, a second portion of the data elements corresponding to trailers that satisfy aggregate inventory readiness data criteria, wherein the second portion of the data elements do not include the first portion of the data elements ranked in the high priority list;

ranking, by the trailer prioritization computer system, the second portion of the data elements into an inventory readiness date list, wherein the ranking of the second portion of the data elements in the inventory readiness date list identifies an order for the trailers to be unloaded at the first distribution center based on information indicating the aggregate inventory readiness date of the trailers in the inventory readiness date list;

identifying, by the trailer prioritization computer system, a subset of the data elements in the inventory readiness date list corresponding to trailers having the same aggregate inventory readiness date;

ranking, by the trailer prioritization computer system, the identified subset of the data elements at a top of the inventory readiness date list based on the corresponding trailers satisfying needed items criteria, the needed items criteria determined using the received real-time store inventory data for store item inventory for the plurality of store locations;

sorting, by the trailer prioritization computer system, the high priority list and the ranked inventory readiness date list into a trailer unload prioritization list, wherein the trailer unload prioritization list identifies an order for the plurality of trailers to be unloaded at the first distribution center; and transmitting, by the trailer prioritization computer system to an output computing device at the first distribution center in the network of distribution centers, instructions to unload the plurality of trailers at the first distribution center according to the trailer unload prioritization list.

2. The method of claim 1, wherein determining, by the trailer prioritization computer system and for each trailer of the plurality of trailers, an aggregate inventory readiness date comprises:

selecting a trailer from the plurality of trailers;
receiving an inventory list for the selected trailer;
retrieving an inventory readiness date for each item in the inventory list of the selected trailer; and
determining the aggregate inventory readiness date for the selected trailer based on calculating at least one of an average, a mean, a median, a minimum, or a maximum inventory readiness date based on the inventory readiness date for each item in the inventory list.

3. The method of claim 1, wherein ranking, by the trailer prioritization computer system, the first portion of the data elements into a high priority list of data elements comprises:

receiving a list of high priority categories;
comparing an inventory list of each of the plurality of trailers to the list of high priority categories;
prioritizing, into the high priority list and based on comparing the inventory list of each of the trailers to the list of high priority categories, one or more trailers having items that correspond to the list of high priority categories;
determining whether one or more remaining trailers that were not prioritized into the high priority list contain a quantity of items that exceeds a predetermined threshold quantity; and
adding, to the high priority list, the one or more remaining trailers that have a quantity of items that exceeds the predetermined threshold quantity.

4. The method of claim 1, wherein the data elements in the inventory readiness date list are ranked from earliest inventory readiness date to latest inventory readiness date.

5. The method of claim 1, wherein ranking by the trailer prioritization computer system, the identified subset of the data elements at a top of the inventory readiness date based on the corresponding trailers satisfying needed items criteria comprises:

receiving a list of needed items for stores serviced by the distribution center;
comparing an inventory list of each of the trailers in the identified subset of the data elements in the inventory readiness date list to the list of needed items;
identifying one or more trailers in the identified subset having needed items based on comparing the inventory list of each of the trailers to the list of needed items;
determining, for each of the one or more trailers in the identified subset having needed items, a quantity of needed items;
assigning, for each of the one or more trailers in the identified subset having needed items, a store need score based on the quantity of needed items; and
ranking the identified subset of the data elements at the top of the inventory readiness date list based on the store need score of each of the one or more trailers in the identified subset having needed items.

6. The method of claim 5, wherein the store need score is a numeric value indicating a proportion of a trailer that contains needed items.

7. The method of claim 5, wherein a trailer having a higher store need score is ranked above a trailer having a lower store need score in the identified subset of the data elements in the inventory readiness date list.

8. The method of claim 1, wherein ranking, by the trailer prioritization computer system, the first portion of the data elements into the high priority list further comprises ranking the first portion of the data elements having indications of high priority items based on at least one of an urgency of a high priority item, a quantity of the high priority item in each of the trailers, or the aggregate inventory date of each of the trailers.

9. The method of claim 1, wherein the output computing device is at least one of a mobile device, a smartphone, a tablet, or a distribution center computing system.

10. The method of claim 5, further comprising:
receiving store need information from each of the stores serviced by the first distribution center, wherein the store need information includes a list of needed items, a quantity needed of each needed item, and an inventory position of each needed item;
determining, based on the received store need information, an aggregate quantity of each needed item across the stores serviced by the first distribution center; and
ranking, based on the inventory position of each needed item, the needed items across the stores serviced by the first distribution center.

11. The method of claim 5, further comprising receiving, in real-time, an updated list of needed items for at least one of the stores serviced by the first distribution center.

12. The method of claim 5, further comprising receiving, at predetermined times, one or more lists of needed items for the stores services by the first distribution center.

13. The method of claim 1, further comprising updating at least one of the high priority list and the ranked inventory readiness date list based on receiving real-time information about at least one of one or more trailers, high priority items, or needed items, wherein the real-time information about at least one of one or more trailers includes an event indicating at the at least one of one or more trailers has arrived at the first distribution center.

14. A system for prioritizing trailers, the system comprising:
one or more processors; and
computer-readable memory storing instructions that, when executed by the processors, cause the processors to perform operations comprising:
receiving first tracking data indicating at least one departure event for a first trailer, wherein the tracking data includes data generated by one or more wireless data tags associated with one or more items carried by the first trailer;
determining an inventory readiness metric for at least one item carried by the first trailer using the received tracking data;
receiving second tracking data for the first trailer, the second tracking data being received at a later point in time than the first tracking data;
updating the inventory readiness metric for the at least one item carried by the first trailer using the second tracking data;
receiving, from a plurality of store computer systems, real-time store inventory data for store item inventory for a plurality of store locations;
listening for events indicating that trailers have physically arrived at distribution centers in a network of distribution centers;
receiving, based on listening for the events, an event indicating that the first trailer has arrived at a first distribution center in the network of distribution centers, wherein the event comprises a GPS location heartbeat message;
identifying, based on the received event, the first distribution center where the first trailer arrived;
in response to receiving the event, performing the following operations to generate prioritization instructions for unloading trailers at the first distribution center:
retrieving, by the trailer prioritization computer system and from a supply chain tracking computer system, data elements that correspond to a plurality of trailers awaiting to be unloaded at the first distribution center in the network of distribution centers, wherein the plurality of trailers includes the first trailer indicated by the received event;
determining, for each trailer of the plurality of trailers, an aggregate inventory readiness date, wherein the aggregate inventory readiness date is an aggregation of inventory readiness dates for all items in the trailer, and wherein the aggregate inventory readiness data is determined using the updated inventory readiness metric for the at least one item carried by the first trailer;
ranking the first portion of the data elements into a high priority list of data elements, wherein the ranking of the first portion of the data elements in the high priority list identifies an order for the trailers to be unloaded at the first distribution center based on information indicating high priority items for the trailers in the high priority list;
selecting, by the trailer prioritization computer system, a second portion of the data elements corresponding to trailers that satisfy aggregate inventory readiness data criteria, wherein the second portion of the data elements do not include the first portion of the data elements ranked in the high priority list;
ranking the second portion of the data elements into an inventory readiness date list, wherein the ranking of the second portion of the data elements in the inventory readiness date list identifies an order for the trailers to be unloaded at the first distribution center based on information indicating the aggregate inventory readiness date of the trailers in the inventory readiness date list;
identifying, by the trailer prioritization computer system, a subset of the data elements in the inventory readiness date list corresponding to trailers having the same aggregate inventory readiness date;
ranking the identified subset of the data elements at a top of the inventory readiness date list based on the corresponding trailers satisfying needed items criteria, the needed items criteria determined using the received real-time store inventory data for store item inventory for the plurality of store locations;
sorting the high priority list and the ranked inventory readiness date list into a trailer unload prioritization list, wherein the trailer unload prioritization list identifies an order for the plurality of trailers to be unloaded at the first distribution center; and transmitting, to an output computing device at the first distribution center in the network of distribution centers, instructions to unload the plurality of trailers at the first distribution center according to the trailer unload prioritization list.

15. The system of claim 14, wherein determining, for each trailer of the plurality of trailers, an aggregate inventory readiness date comprises:
    selecting a trailer from the plurality of trailers;
    receiving an inventory list for the selected trailer;
    retrieving an inventory readiness date for each item in the inventory list of the selected trailer;
    determining the aggregate inventory readiness date for the selected trailer based on calculating at least one of an average, a mean, a median, a minimum, or a maximum inventory readiness date based on the inventory readiness date for each item in the inventory list.

16. The system of claim 14, wherein ranking the first portion of the data elements into a high priority list of data elements comprises:
    receiving a list of high priority categories;
    comparing an inventory list of each of the plurality of trailers to the list of high priority categories;
    prioritizing, into the high priority list and based on comparing the inventory list of each of the trailers to the list of high priority categories, one or more trailers having items that correspond to the list of high priority categories;
    determining whether one or more remaining trailers that were not prioritized into the high priority list contain a quantity of items that exceeds a predetermined threshold quantity; and
    adding, to the high priority list, the one or more remaining trailers that have a quantity of items that exceeds the predetermined threshold quantity.

17. The system of claim 14, wherein ranking the identified subset of the data elements at a top of the inventory readiness date based on the corresponding trailers satisfying needed items criteria comprises:
    receiving a list of needed items for stores serviced by the distribution center;
    comparing an inventory list of each of the trailers in the identified subset of the data elements in the inventory readiness date list to the list of needed items;
    identifying one or more trailers in the identified subset having needed items based on comparing the inventory list of each of the trailers to the list of needed items;
    determining, for each of the one or more trailers in the identified subset having needed items, a quantity of needed items;
    assigning, for each of the one or more trailers in the identified subset having needed items, a store need score based on the quantity of needed items; and
    ranking the identified subset of the data elements at the top of the inventory readiness date list based on the store need score of each of the one or more trailers in the identified subset having needed items.

18. The system of claim 14, wherein ranking the first portion of the data elements into the high priority list further comprises ranking the first portion of the data elements having indications of high priority items based on at least one of an urgency of a high priority item, a quantity of the high priority item in each of the trailers, or the aggregate inventory date of each of the trailers.

19. The system of claim 17, wherein the operations further comprise receiving, in real-time, an updated list of needed items for at least one of the stores serviced by the first distribution center.

20. The system of claim 17, wherein the operations further comprise:
    receiving store need information from each of the stores serviced by the first distribution center, wherein the store need information includes a list of needed items, a quantity needed of each needed item, and an inventory position of each needed item;
    determining, based on the received store need information, an aggregate quantity of each needed item across the stores serviced by the first distribution center; and
    ranking, based on the inventory position of each needed item, the needed items across the stores serviced by the first distribution center.

* * * * *